Figure 1:
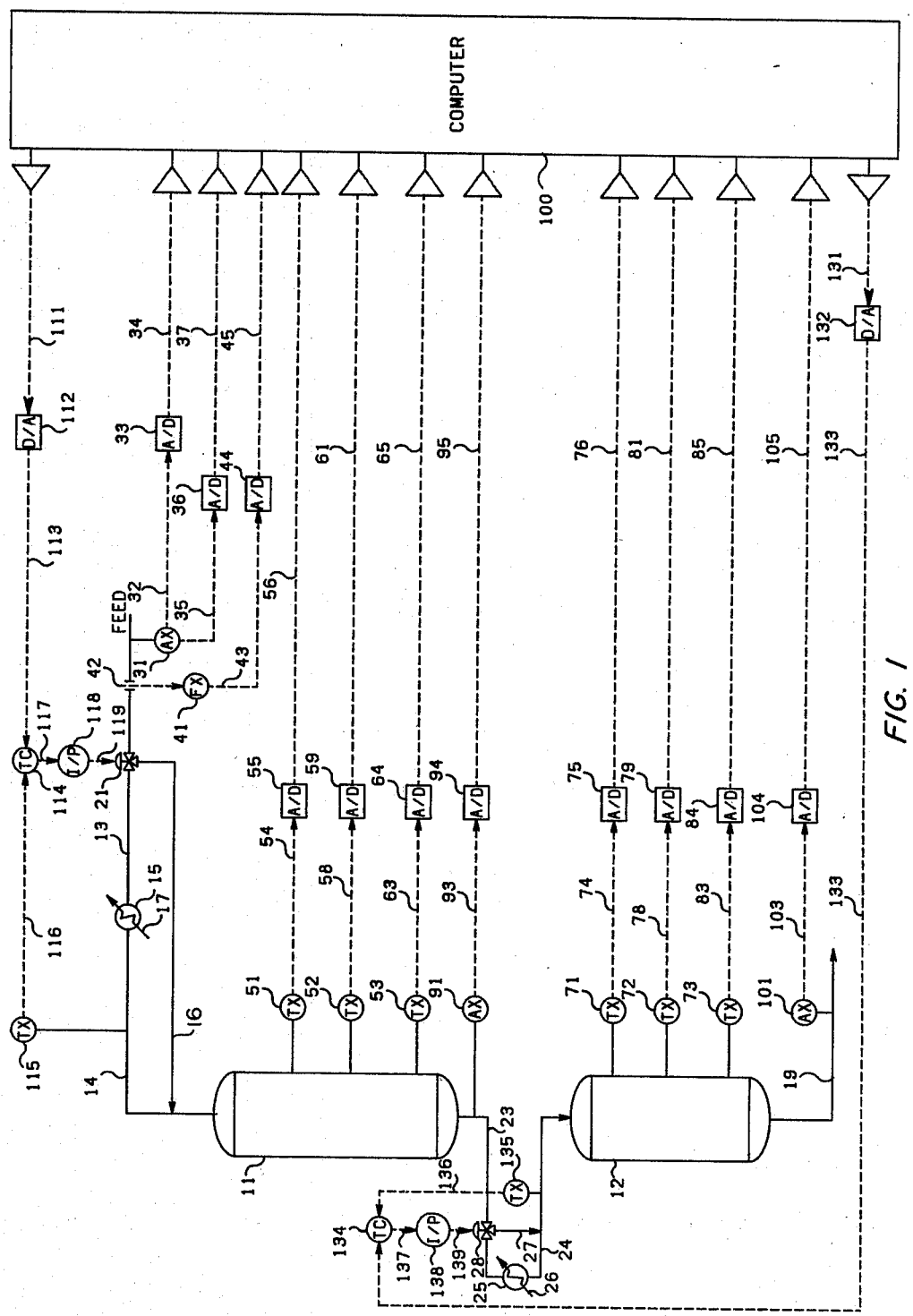

United States Patent [19]

Killebrew, Jr. et al.

[11] 4,236,219
[45] Nov. 25, 1980

[54] TEMPERATURE CONTROL OF EXOTHERMIC REACTIONS

[75] Inventors: Wilbur N. Killebrew, Jr., Phoenix, Ariz.; Charles M. Stewart, Bartlesville, Okla.

[73] Assignee: Phillips Petroleum Company, Bartlesville, Okla.

[21] Appl. No.: 35,198

[22] Filed: May 2, 1979

[51] Int. Cl.³ ............... G05B 13/04; G06F 15/46; C07C 5/02

[52] U.S. Cl. ............... 364/501; 208/DIG. 1; 208/143; 260/690; 260/700; 364/106; 364/116; 422/62; 422/109; 585/259; 585/956

[58] Field of Search ............... 364/500, 501, 502, 105, 364/106, 116, 118; 208/DIG. 1, 48 R, 48 Q, 106, 132, 107, 108, 142–145; 422/62, 109; 23/230 A; 260/690, 699, 700; 585/259, 263, 501, 956

[56] References Cited

U.S. PATENT DOCUMENTS

| | | | |
|---|---|---|---|
| 3,424,809 | 1/1969 | Johnston | 585/501 X |
| 3,471,582 | 10/1969 | Lupfer | 585/259 |
| 3,506,715 | 4/1970 | Clark | 23/230 A X |
| 3,653,842 | 4/1972 | Putman | 364/502 X |
| 3,656,911 | 4/1972 | Hobbs | 422/62 |
| 3,839,483 | 10/1974 | Carr et al. | 208/DIG. 1 X |
| 4,132,529 | 1/1979 | Schwimmer | 364/500 X |

Primary Examiner—Joseph F. Ruggiero

[57] ABSTRACT

In a selective hydrogenation process wherein at least two catalyst beds in series are utilized, the temperature of the feed stream to the first catalyst bed and the temperature of the feed stream from the first catalyst bed to the second catalyst bed are manipulated so as to maintain a desired reaction temperature in both catalyst beds. The desired reaction temperature of the first catalyst bed is manipulated so as to insure that a desired percent of a specific feed component is selectively hydrogenated in the first catalyst bed. The reaction temperature of the second catalyst bed is manipulated so as to maintain a desired concentration of the specific feed component in the product stream from the second catalyst bed.

52 Claims, 2 Drawing Figures

TEMPERATURE CONTROL OF EXOTHERMIC REACTIONS

This invention relates to temperature control of an exothermic reaction. In a specific aspect this invention relates to selective hydrogenation of unsaturated hydrocarbons in mixed hydrocarbon streams. In another specific aspect this invention relates to selective hydrogenation of acetylenic compounds in olefin-rich hydrocarbon streams.

In many exothermic chemical reactions it is necessary to control temperature within certain limits in order to maintain satisfactory yields and to prevent side reactions. This is particularly true in selective hydrogenation processes. For example, ethylene is commonly produced by the thermal cracking of hydrocarbon feedstocks. Unfortunately, some acetylene (impurity) is also produced which must be removed for many applications. This can be accomplished by selective catalytic hydrogenation of the acetylene.

In selective hydrogenation operations of this type, it is very important to maintain the operating temperature within narrow limits. If the temperature is too low, the hydrogenation reaction is not carried out in a sufficiently complete manner to remove the acetylene. If the temperature becomes too high, side reactions such as the hydrogenation of ethylene and the formation of polymers may result. It is also very important to prevent excessive temperatures from being reached because of the danger of explosions.

It is also important, where two catalyst beds in series are utilized as in the present invention, to maintain a relationship between the percentage of the acetylene hydrogenated in the first catalyst bed and the percentage of the acetylene hydrogenated in the second catalyst bed. Preferably the first catalyst bed is utilized to hydrogenate most of the acetylene with the second catalyst bed being utilized primarily as a cleanup process. Close control of the percentage of the acetylene hydrogenated in each catalyst bed provides for a more efficient conversion of acetylene and reduces the risk of excessive temperature in either catalyst bed.

It is thus an object of this invention to provide method and apparatus for controlling the reaction temperature of an exothermic chemical reaction process. Another object of this invention is to provide method and apparatus for controlling the selective hydrogenation of unsaturated hydrocarbons in mixed hydrocarbon streams. Still another object of this invention is to provide method and apparatus for controlling the selective hydrogenation of acetylenic compounds in olefin-rich hydrocarbon streams.

In accordance with the present invention, a selective hydrogenation process which utilizes two catalyst beds in series is controlled so as to maintain a desired reaction temperature in each catalyst bed. The reaction temperature of the first reactor is manipulated so as to insure that a desired percentage of the impurity will be hydrogenated in the first reactor. The reaction temperature of the second reactor is manipulated so as to insure that the concentration of the impurity in the product flowing from the second reactor is maintained below a predetermined level. Two separate reactors may be utilized or a single reactor with two catalyst beds may be utilized so long as control and analysis of the fluid stream flowing between the two catalyst beds is possible. Hereafter, the term first reactor and second reactor is utilized to describe the invention but the invention is not limited to the use of separate reactor vessels.

The feed stream to the first reactor and the feed stream from the first reactor to the second reactor are split into at least two portions. A first portion of the feed stream to the first reactor is heated before being passed to the first reactor. A second portion of the feed stream to the first reactor is utilized as a quench fluid and is introduced into the first portion of the feed stream to the first reactor after the first portion of the feed stream to the first reactor has been heated. The first portion of the feed stream from the first reactor to the second reactor is supplied directly to the second reactor. The second portion of the feed stream from the first reactor to the second reactor is cooled and is utilized as a quench fluid and is introduced into the first portion of the feed stream from the first reactor to the second reactor before the feed stream enters the second reactor.

An analysis of the feed stream flowing to the first reactor is utilized to provide an indication of the amount of acetylene in the feed stream. An analysis of the feed stream flowing from the first reactor to the second reactor is utilized to provide an indication of the amount of acetylene in the feed stream flowing from the first reactor to the second reactor. The temperature of the feed stream flowing to the first reactor is controlled in response to the analysis of the amount of acetylene in the feed stream flowing to the first reactor and the analysis of the amount of acetylene in the feed stream flowing from the first reactor to thereby maintain a desired percent conversion of the acetylene in the first reactor.

A feed forward model based on an analysis of the acetylene in the feed stream flowing to the first reactor, an analysis of the amount of carbon monoxide in the feed stream flowing to the first reactor and the flow rate of the feed stream flowing to the first reactor is utilized to predict temperature changes required for the feed stream flowing to the first reactor to maintain the desired percent conversion of acetylene in the first reactor. This prediction is utilized to bias the control of the temperature of the feed stream based on the analysis of the feed stream flowing to the first reactor and the analysis of the feed stream flowing from the first reactor to thereby compensate for required temperature changes before the analysis of the feed stream flowing from the first reactor indicates that a temperature change should have been made to compensate for some change in the feed rate or some change in the composition of the feed stream.

An analysis of the product stream flowing from the second reactor provides an indication of the concentration of acetylene in the product stream flowing from the second reactor. This concentration is compared to a predetermined concentration and the comparison is utilized to manipulate the temperature of the feed stream flowing from the first reactor to the second reactor. A feed forward model based on the analyses of the feed stream to the first and second reactor and the flow rate of the feed stream to the first reactor is utilized to provide a prediction of required changes in the temperature of the feed stream flowing from the first reactor to the second reactor necessary to maintain the concentration of acetylene in the product stream flowing from the second reactor below the predetermined level. This prediction is utilized to bias the comparison of the desired concentration of acetylene with the actual concentration of acetylene to thereby provide feed forward predictive control for the second reactor.

In this manner, the required reaction temperatures are maintained in each reactor. A desired percentage of acetylene is hydrogenated in the first reactor and the concentration of acetylene in the product stream from the second reactor is maintained below the predetermined level.

Figure 2A:
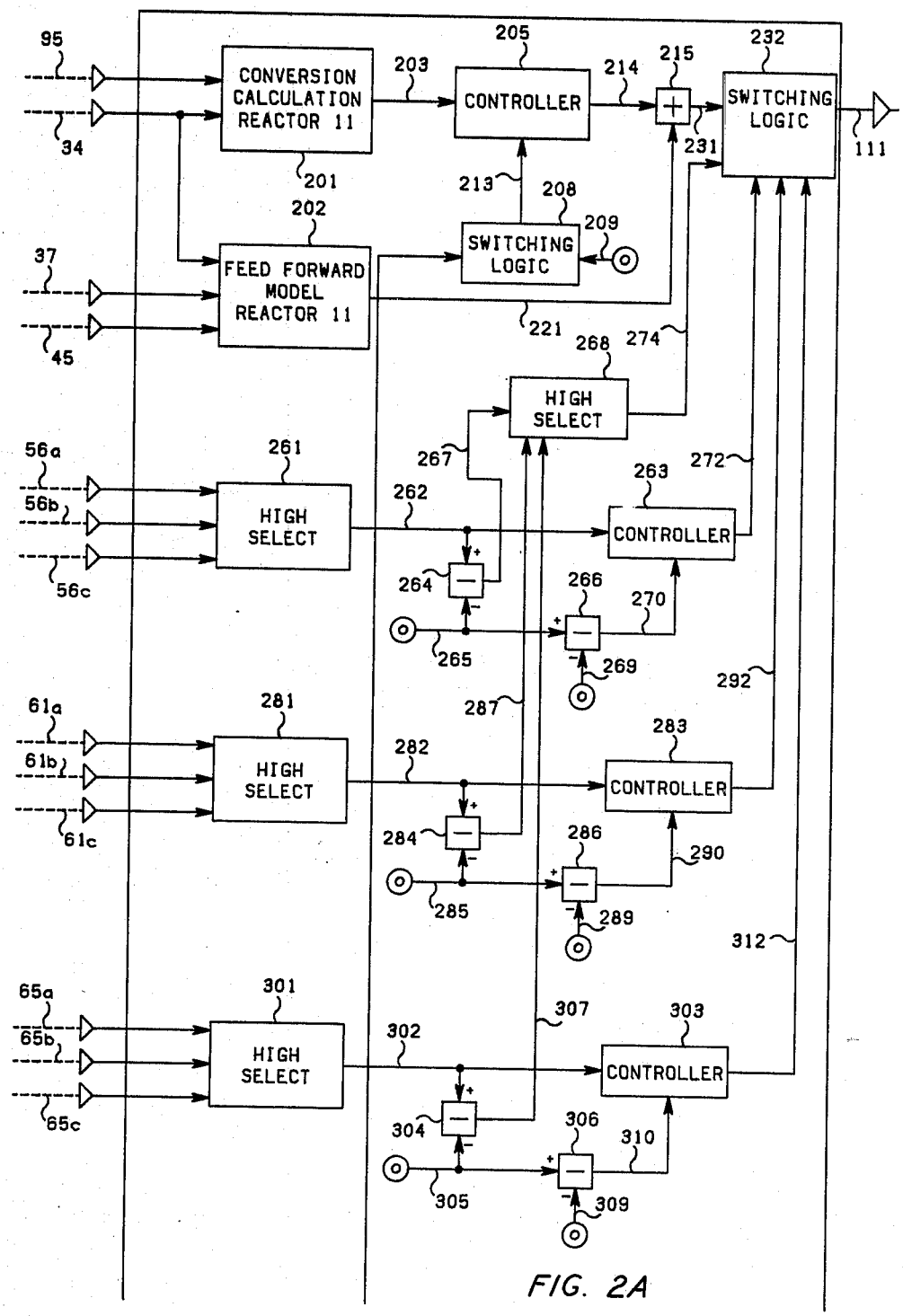
Figure 2B:
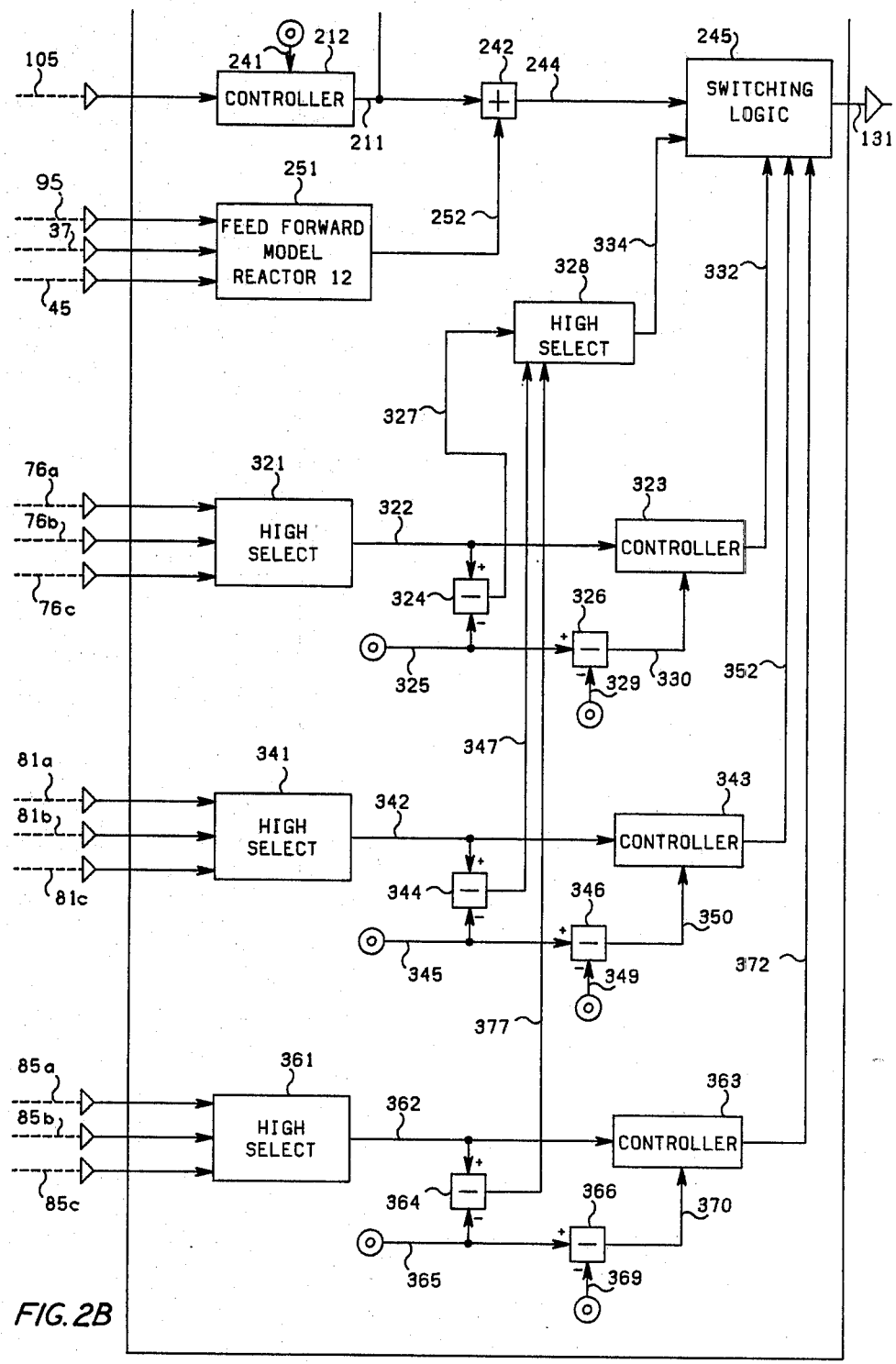

Other objects and advantages of the invention will be apparent from the description of the invention and the appended claims as well as from the detailed description of the drawings in which:

FIG. 1 is a schematic diagram of a selective hydrogenation process with an associated control system; and FIGS. 2a and 2b combined are a logic diagram of the computer logic utilized to generate the control signals utilized in the control of the selective hydrogenation process illustrated in FIG. 1.

The invention is illustrated and described in terms of a selective hydrogenation process for the hydrogenation of acetylene in an ethylene product. However, it should be understood that this invention can be utilized for carrying out other selective hydrogenation processes such as the conversion of diolefins to olefins and/or saturated compounds.

Although the invention is illustrated and described in terms of a specific hydrogenation process, the applicability of the invention described herein extends to other process configurations such as using different heat exchanger configurations, more than two reactors or, as has been previously stated, two catalysts beds in a single reactor vessel. The invention also extends to different types of control system configurations which accomplish the purpose of the invention. Lines designated as signal lines in the drawings are pneumatic in this preferred embodiment. However, this invention is also applicable to electrical, mechanical, hydraulic or other signal means for transmitting information. In many control systems some combination of these types of signals will be used. However, use of any other type of signal transmission, compatible with the process and equipment in use, is within the scope of the invention.

Both the analog and digital controllers shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is within the scope of the invention. The operation of proportional-integral controllers is well known in the art. The output control signal of a proportional-integral controller may be represented as $$S = K_1 E + K_2 \int E dt$$

where

S = output control signals;
E = difference between two input signals; and
$K_1$ and $K_2$ = constants.

The scaling of an output signal by a controller is well known in control systems art. Essentially, the output of a controller may be scaled to represent any desired factor or variable. An example of this is where a desired pressure and an actual pressure is compared by a controller. The output could be a signal representative of a desired change in the flow rate of some gas necessary to make the desired and actual pressures equal. On the other hand, the same output signal could be scaled to represent a percentage or could be scaled to represent a temperature change required to make the desired and actual pressures equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other types of equipment or combinations of one or more of such equipment types. While the presently preferred embodiment of the invention preferably utilizes pneumatic control elements in conjunction with pneumatic signal handling and translation apparatus, the apparatus and method of the invention can be implemented using a variety of specific equipment available to and understood by those skilled in the process control art. Likewise, the format of the various signals can be modified substantially in order to accommodate signal format requirements of a particular installation, safety factors, the physical characteristics of the measuring or control instruments and other similar factors. For example, a measurement of a system parameter may exhibit a generally proportional relationship to the square of the actual system parameter. Other measuring instruments might produce a signal which is proportional to the measured parameter, and still other measuring instruments may produce a signal which bears a more complicated, but known, relationship to the measured system parameter. In addition all signals could be translated into a "suppressed zero" or other similar format in order to provide a "live zero" and prevent an equipment failure from being erroneously interpreted as a low (or high) measurement or control signal. Regardless of the signal format or the exact relationship of the signal to the parameter which it represents, each signal representative of a measured process parameter or representative of a desired process value will bear a relationship to the measure parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, an ethylene feed stream containing some concentration of acetylene and carbon monoxide is introduced through conduit means 13 and 14 to the reactor 11 which contains a first catalyst bed containing a hydrogenation catalyst. Heat exchanger 15 is operably located between conduit means 13 and 14 such that fluid from conduit means 13 flows through heat exchanger 15. The heat exchanger 15 is utilized to provide heat to the feed stream flowing through conduit means 13 and 14 to the reactor 11. Steam or another suitable heating fluid is provided through conduit means 17 to the heat exchanger 15 and is utilized to provide heat to the feed flowing through conduit means 13 and 14. The pneumatic control valve 21 is operably located in conduit means 13 and is utilized to split the flow of the feed between conduit means 13 and conduit means 16. The feed flowing through conduit means 14 and the bypass conduit means 16 are preferably mixed before the feed enters the reactor 11. The feed flowing through the bypass conduit means 16 is utilized as a quench fluid to provide further temperature control of the feed flowing to the reactor 11.

The effluent flowing from the reactor 11 is passed through conduit means 23 and 24 to the reactor 12 which contains a second catalyst bed containing a hydrogenation catalyst. Heat exchanger 25, which is operably located between conduit means 23 and 24, is utilized to provide a means for cooling the effluent flowing through conduit means 23 and 24. A cooling fluid, such as water, is provided through conduit means 26 to the heat exchanger 25. The pneumatic control valve 28, which is operably located in conduit means 23, is utilized to control the relationship between the amount of effluent flowing from the reactor 11 which flows to the reactor 12 through the heat exchanger 25 and through the bypass conduit means 27. The effluent flowing through conduit means 27 may be considered the primary effluent stream and the effluent flowing through conduit means 23, the heat exchanger means 25, and conduit means 24 may be considered the quench fluid stream. The two fluid streams flowing through conduit means 27 and conduit means 24 are preferably mixed before entering the reactor 12.

The ethylene product, which will generally have a very low concentration of acetylene, is removed from the reactor 12 through conduit means 19. The product removed from the reactor 12 through conduit means 19 is generally provided to other portions of the ethylene manufacturing process.

The selective hydrogenation process described to this point is a conventional selective hyrogenation process. It is the manner in which the selective hydrogenation process, illustrated in FIG. 1, is controlled so as to maintain a desired percentage conversion of acetylene in reactor 11 and to maintain the concentration of acetylene in the product flowing from the reactor 12 through conduit means 19 below a predetermined level which provides the novel features of the present invention.

Control of the selective hydrogenation process illustrated in FIG. 1 is generally accomplished by measuring a plurality of system parameters and supplying the measured parameters to computer means 100. Computer means 100 is preferably an Optrol 3600 manufactured by Applied Automation, Inc., Bartlesville, Okla. Computer means 100 is also supplied with a plurality of set point signals which are representative of desired operating characteristics for the selective hydrogenation process illustrated in FIG. 1. In response to the measured inputs and the set point inputs, computer means 100 calculates the temperature of the feed stream flowing to the reactor 11 and the temperature of the feed stream flowing to the reactor 12 required to maintain a desired percent conversion of acetylene in the reactor 11 and to maintain the concentration of acetylene in the bottom product flowing from the reactor 12 through conduit means 19 below the predetermined level.

Analyzer transducer 31, which is operably connected to the conduit means 13, provides a pair of output signals 32 and 35. Signal 32, which is representative of the concentration of acetylene in the feed stream flowing to conduit means 13, is provided from the analyzer transducer 31 to the analog to digital (A/D) converter 33. Signal 32 is converted from analog form to digital form by the A/D converter 33 and is provided a signal 34 to computer means 100. Signal 35, which is representative of the concentration of carbon monoxide in the feed stream flowing through conduit means 13, is provided from the analyzer transducer 31 as an input to the A/D converter 36. Signal 35 is converted from analog form to digital form by the A/D converter 36 and is provided as signal 37 to computer means 100.

The flow transducer 41 in combination with the flow sensor 42, which is operably located in conduit means 13, provides an output signal 43 which is representative of the flow rate of the feed stream flowing through conduit means 13. Signal 43 is provided from the flow transducer 41 as an input to the A/D converter 44. Signal 43 is converted from analog form to digital form by the A/D converter 44 and is provided as signal 45 to computer means 100.

Temperature transducers 51, 52 and 53, which are each representative of three temperature transducers, provide a plurality of output signals which represent a temperature profile across the reactor 11. The three temperature transducers, represented by temperature transducer 51, in combination with three thermocouple elements, which are operably located in reactor 11, provide three output signals which are represented by signal 54. The three output signals, represented by signal 54, are representative of a temperature profile of the upper portion of the reactor 11. The three signals, represented by signal 54, are provided from the three temperature transducers, represented by temperature transducer 51, to three A/D converters represented by A/D converter 55. The three temperature signals, represented by signal 54, are converted from analog form to digital form by three A/D converters, represented by A/D converter 55, and are provided as three signals, represented by signal 56, to the computer means 100.

The three temperature transducers, represented by temperature transducer 52, in combination with three thermocouple elements, which are operably located in reactor 11, provide three output signals which are represented by signal 58. The three output signals, represented by signal 58, are representative of a temperature profile of the middle portion of the reactor 11. The three signals, represented by signal 58, are provided from the three temperature transducers, represented by temperature transducer 52, to three A/D converters represented by A/D converter 59. The three temperature signals, represented by signal 58, are converted from analog form to digital form by the three A/D converters, represented by A/D converter 59 and are provided as three signals, signal 56, to the computer means 100.

The three temperature transducers, represented by temperature transducer 53, in combination with three thermocouple elements which are operably located in reactor 11 provide three output signals which are represented by signal 63. The three output signals, represented by signal 63 are representative of a temperature profile of the lower portion of the reactor 11. The three signals, represented by signal 63, are provided from the three temperature transducers, represented by temperature transducer 53, to three A/D converters represented by A/D converter 64. The three temperature signals, represented by signal 63, are converted from analog form to digital form by the three A/D converters, represented by A/D converter 64 and are provided as three signals, represented by signal 65, to the computer means 100.

Temperature transducer 71, 72 and 73, which are each representative of three temperature transducers, provide a plurality of output signals which represent a temperature profile across the reactor 12. The three temperature transducers, represented by temperature transducer 71, in combination with three thermocouple elements which are operably located in reactor 12 provide three output signals which are represented by signal 74. The three output signals, represented by signal 74, are representative of a temperature profile of the upper portion of the reactor 12. The three signals, represented by signal 74, are provided from the three temperature transducers, represented by temperature transducer 71, to three A/D converters represented by A/D converter 75. The three temperature signals, represented by signal 74, are converted from analog form to digital form by the three A/D converters, represented by A/D converter 75, and are provided as three signals, represented by signal 76 to the computer means 100.

The three temperature transducers, represented by temperature transducer 72, in combination with three thermocouple elements which are operably located in reactor 12 provide three output signals which are represented by signal 78. The three output signals, represented by signal 78, are representative of a temperature profile of the middle portion of the reactor 12. The three signals, represented by signal 78, are provided from the three temperature transducers, represented by temperature transducer 72, to three A/D converters represented by A/D converter 79. The three temperature signals, represented by signal 78, are converted from analog form to digital form by the three A/D converters, represented by A/D converter 79, and are provided as three signals, represented by signal 81, to the computer means 100.

The three temperature transducers, represented by temperature transducer 73, in combination with three thermocouple elements which are operably located in reactor 12 provide three output signals which are represented by signal 83. The three output signals, represented by signal 83, are representative of a temperature profile of the lower portion of the reactor 12. The three signals, represented by signal 83, are provided from the three temperature transducers, represented by temperature transducer 73, to three A/D converters represented by A/D converter 84. The three temperature signals, represented by signal 83, are converted from analog form to digital form by the three A/D converters, represented by A/D converter 84, and are provided as three signals, represented by signal 85, to the computer means 100.

Analyzer transducer 91, which is preferably a chromatographic analyzer, is operably connected to conduit means 23. The analyzer transducer 91 provides an output signal 93 which is representative of the concentration of acetylene in the effluent flowing through conduit means 23. Signal 93 is provided from the analyzer transducer 91 as an input to the A/D converter 94. Signal 93 is converted from analog form to digital form and is provided as signal 95 to computer means 100.

Analyzer transducer 101, which is preferably a chromatographic analyzer, is operably connected to conduit means 19. The analyzer transducer 101 provides an output signal 103 which is representative of the concentration of acetylene in the effluent flowing through conduit means 19. Signal 103 is provided from the analyzer transducer 101 as an input to the A/D converter 104. Signal 103 is converted from analog form to digital form and is provided as signal 105 to computer means 100.

In response to the described inputs, computer means 100 calculates two control signals which are utilized in controlling the selective hydrogenation process illustrated in FIG. 1. One control signal 111, calculated by the computer means 100, is representative of the temperature of the feed stream flowing to the reactor 11 required to maintain a desired reaction temperature in the reactor 11 which will insure that a desired percentage of acetylene is selectively hydrogenated in reactor 11. Signal 111 is provided from computer means 100 as an input to the digital to analog (D/A) converter 112. Signal 111 is converted from digital form to analog form by the D/A converter 112 and is provided as signal 113 to the temperature controller 114. The temperature transducer 115 in combination with a temperature measuring device such as a thermocouple, which is operably located in conduit means 14, provides an output signal 116 which is representative of the actual temperature of the effluent flowing through conduit means 14. Signal 116 is provided from the temperature transducer 115 as a second input to the temperature controller 114. In response to signals 113 and 116, the temperature controller 114 provides an output signal 117 which is responsive to the difference between signals 113 and 116. Signal 117 is scaled so as to be representative of the split of the feedstream between conduit means 13 and the bypass conduit means 16 required to maintain a desired temperature for the feed stream flowing into reactor 11 and thus maintain a desired reaction temperature in reactor 11. Signal 117 is provided from the temperature controller 114 as an input to the current to pressure (I/P) transducer 118. Signal 117 is converted from electrical form to a pneumatic form by the I/P converter 118 and is provided as signal 119 to the pneumatic control valve 21. The pneumatic control valve 21 is manipulated in response to signal 119 to thereby maintain a desired split of the feed stream flowing to reactor 11 between conduit means 13 and the bypass conduit means 16.

A second control signal 131, calculated by the computer means 100, is representative of the temperature of the feed stream flowing to the reactor 12 required to maintain a desired reaction temperature in the reactor 12 which will insure a concentration of acetylene in the product flowing through conduit means 19 which is equal to or less than a desired concentration. Signal 131 is provided from computer means 100 as an input to the digital to analog (D/A) converter 132. Signal 131 is converted from digital form to analog form by the D/A converter 132 and is provided as signal 133 to the temperature controller 134. The temperature transducer 135 in combination with a temperature measuring device such as a thermocouple, which is operably located in conduit means 24, provides an output signal 136 which is representative of the actual temperature of the effluent flowing through conduit means 124. Signal 136 is provided from the temperature transducer 135 as a second input to the temperature controller 134. In response to signals 133 and 136, the temperature controller 134 provides an output signal 137 which is responsive to the difference between signals 133 and 136. Signal 137 is scaled so as to be representative of the split of the feedstream between conduit means 24 and the bypass conduit means 27 required to maintain a desired temperature for the feed stream flowing into reactor 12 and thus maintain a desired reaction temperature in reactor 12. Signal 137 is provided from the temperature controller 134 as an input to the current to pressure (I/P) transducer 138. Signal 137 is converted from electrical form to a pneumatic form by the I/P converter 138 and is provided as signal 139 to the pneumatic control valve 28. The pneumatic control valve 28 is manipulated in response to signal 139 to thereby maintain a desired split of the feed stream flowing to reactor 12 between conduit means 24 and the bypass conduit means 27.

The logic flow diagram utilized to calculate the control signals 111 and 131 in response to the prevously described input signals to the computer means 100 is illustrated in FIG. 2a and FIG. 2b. Referring now to FIGS. 2a and 2b as a combination, signal 95, which is representative of the concentration of acetylene in the feed stream flowing through conduit means 23 from the reactor 11, is provided as a first input to the conversion calculation for reactor 11 block 201. Signal 34, which is representative of the concentration of acetylene in the feed stream flowing to the reactor 11, is provided as a second input to the conversion calculation for reactor 11 block 201 and is also provided as a first input to the feed forward model for reactor 11 block 202. In response to signals 95 and 34, the conversion calculation for reactor 11 block 201 provides an output signal 203 which is representative of the percentage of acetylene in the feed flowing to the reactor 11 which has been converted in reactor 11. Equation (I) is utilized in the conversion calculation for reactor 11 block 201 to calculate signal 203 based on signals 95 and 34.

$$CONV = [1.0 - (A_{out}/c10000.0 \times A_{in})][100.0] \quad (I)$$

where
CONV = the actual percentage of acetylene in the feed stream flowing to the reactor 11 which is converted in the reactor 11;
$A_{in}$ = the concentration of acetylene in the feed stream flowing to reactor 11 (mole percent) (signal 34);
$A_{out}$ = concentration of acetylene in the feed stream flowing out of the reactor 11 (parts per million) (signal 95).

Signal 203 is provided from the conversion calculation for reactor 11 block 201 as an input to the controller block 205. The controller block 205 is a digital implementation of a proportional-integral controller.

The switching logic block 208 is provided with a set point signal 209 which is representative of the desired percentage of acetylene being selectively hydrogenated in reactor 11 (preferably 70%). The switching logic block 208 is also provided with the output signal 211 from the controller block 212. Either signal 211 or signal 209 is selected by the switching logic block 208 to be provided as signal 213 to the controller 205. Signal 209 is selected only when no high temperature limits have been reached in reactor 11 and high temperature limits have been reached in reactor 12. Signal 213, from the switching logic block 208, is representative of the desired percentage of acetylene which is to be selectively hydrogenated in reactor 11. Signal 213 is provided from the switching logic block 208 as a second input to the controller block 205.

In response to signals 203 and 213, the controller block 205 provides an output signal 214 which is responsive to the difference between signals 203 and 213. Signal 214 is representative of the temperature of the feed stream flowing to the reactor 11 required to maintain a desired reaction temperature in the reactor 11 so as to insure that a desired percentage of acetylene is selectively hydrogenated in the reactor 11. Signal 214 is provided from a controller block 205 as a first input to the summing block 215.

Signal 37, which is representative of the concentration of carbon monoxide in the feed stream flowing through conduit means 13, is provided as a second input to the feed forward model for reactor 11 block 202. Signal 45, which is representative of the flow rate of the feed stream flowing to the reactor 11, is provided as a third input to the feed forward model for reactor 11 block 202. In response to the described input signals, the feed forward model for reactor 11 block 202 utilizes Equation (II), Equation (VI) and Equation (X) to provide signal 221 which is representative of a prediction of the change required in the temperature of the feed stream flowing to the reactor 11 to compensate for changes in the composition of the feed stream flowing to the reactor 11 or a change in the flow rate of the feed stream flowing to the reactor 11. Equation (II) represents the feed forward contribution from feed rate changes; Equation (III) represents the feed forward contribution for changes of the concentration of acetylene in the feed stream; and Equation (IV) is representative of the feed forward contribution for changes in the concentration of carbon monoxide in the feed stream. Results of equations (II), (VI) and (IX) are combined to provide signal 221.

$$FF1(n) = [ARR(6)][FF1(n-1)] + [ARR(7)][DF(n-\theta_F)] + [ARR(8)] \quad (II)$$

where
FF1(n) = Feed forward contribution from feed rate changes to first reactor;
FF1(n−1) = FF1(n) from last program pass;
$DF(n-\theta_F)$ = Change in feed rate delayed by $\theta_F$ intervals;
$DF(n-\theta_F-1)$ = $DF(n-\theta_F)$ from last program pass;
ARR(6) = Tuning constant;
ARR(7) = Tuning constant;
ARR(8) = Tuning constant; and
$\theta_F$ = Time required for a change in the feed rate to cause a change in output of analyzer transducer 91.

The tuning constants ARR(6), ARR(7) and ARR(8) are defined as follows:

$$ARR(6) = e - (T/\tau_1) \quad (III)$$

where
T = cycle time for the computer means 100; and
$\tau_1$ = time required for 63% of the process response for reactor 11 to occur in response to a step change in the feed rate to reactor 11.

$$ARR(7) = (-K_1/K_2)(\tau_2/\tau_1) \quad (IV)$$

where
$\tau_2$ = time required for 63% of the process response for reactor 11 to occur in response to a step change in the temperature set point for temperature controller 114;
$K_1$ = the change in the reaction temperature for reactor 11 caused by a change in the flow rate of the feed stream to reactor 11 divided by the change in the flow rate of the feed stream to reactor 11;

$K_2$ = the change in the reaction temperature for reactor 11 caused by a change in the set point to temperature controller 114 divided by the change in the set point; and $\tau_1$ is as previously defined.

$$ARR(8) = \frac{K_1}{K_2} (e^{-\frac{T}{\tau_1}} + \tau_2/\tau_1 - 1) \tag{V}$$

where $K_1$, $K_2$, T, $\tau_1$ and $\tau_2$ are as previously defined.

$$FF2(n) = [ARR(36)][FF2(n-1)] + [ARR(37)][DA(n-\theta_A)] + [ARR(38)][DA(n-\theta_A-1)] \tag{VI}$$

where
FF2(n) = Feed forward for change in the concentration of acetylene in feed to first reactor;
FF2(n−1) = FF2(n) from last program pass;
DA(n−$\theta_A$) = Change in the concentration of acetylene delayed by $\theta_A$ intervals;
DA(n−$\theta_A$−1) = DA(n−$\theta_A$) from last program pass;
ARR(36) = Tuning constant;
ARR(37) = Tuning constant;
ARR(38) = Tuning constant; and
$\theta_A$ = Time required for a change in the concentration of acetylene to cause a change in the output of analyzer transducer 91.

The tuning constants ARR(36), ARR(37) and ARR(38) are defined as follows:

$$ARR(36) = e^{-(T/\tau_3)} \tag{VII}$$

where
T = cycle time for the computer means 100; and
$\tau = 3$ = time required for 63% of the process response for reactor 11 to occur in response to a step change in the concentration of acetylene in the feed flowing to reactor 11.

$$ARR(37) = (-K_3/K_2)(\tau_4/\tau_1) \tag{VIII}$$

where
$\tau_4$ = time required for 63% of the process response for reactor 11 to occur in response to a step change in the temperature set point for temperature controller 114;
$K_3$ = the change in the reaction temperature for reactor 11 caused by a change in the acetylene concentration in the feed stream to reactor 11 divided by the change in the acetylene concentration in the feed stream to reactor 11;
$K_4$ = the change in the reaction temperature for reactor 11 caused by a change in the set point to temperature controller 114 divided by the change in the set point; and
$\tau_3$ is as previously defined.

$$ARR(38) = \frac{K_3}{K_4} (e^{-\frac{T}{\tau_3}} + \tau_4/\tau_3 - 1) \tag{IX}$$

where $K_3$, $K_4$, T, $\tau_3$ and $\tau_4$ are as previously defined.

$$FF3(n) = [ARR(66)][FF3(n-1)] + [ARR(67)][DC(n-\theta_C)] + [ARR(68)][DC(n-\theta_C-1)] \tag{X}$$

where

FF3(n) = Feed forward for change in the concentration of carbon monoxide in feed to first reactor;
FF3(n−1) = FF3(n) from last program pass;
DC(n−$\theta_C$) = Change in the concentration of carbon monoxide delayed by $\theta_C$ intervals;
DC(n−$\theta_C$−1) = DC(n−$\theta_C$) from last program pass;
ARR(66) = Tuning constant;
ARR(67) = Tuning constant;
ARR(68) = Tuning constant; and
$\theta_C$ = Time required for a change in the concentration of carbon monoxide to cause a change in the output of analyzer transducer 91.

The tuning constants ARR(66), ARR(67) and ARR(68) are defined as follows:

$$ARR(66) = e^{-(T/\tau_5)} \tag{XI}$$

where
T = cycle time for the computer means 100; and
$\tau_5$ = time required for 63% of the process response for reactor 11 to occur in response to a step change in the concentration of carbon monoxide flowing to reactor 11.

$$ARR(67) = (-K_5/K_6)(\tau_6/\tau_5) \tag{XII}$$

where
$\tau_6$ = time required for 63% of the process response for reactor 11 to occur in response to a step change in the temperature set point for temperature controller 114;
$K_5$ = the change in the reaction temperature for reactor 11 caused by a change in the carbon monoxide in the feed stream to reactor 11 divided by the change in the carbon monoxide in the feed stream to reactor 11;
$K_6$ = the change in the reaction temperature for reactor 11 caused by a change in the set point to temperature controller 114 divided by the change in the set point; and
$\tau_5$ is as previously defined.

$$ARR(68) = \frac{K_5}{K_6} (e^{-\frac{T}{\tau_5}} + \tau_6/\tau_5 - 1) \tag{XIII}$$

where $K_5$, $K_6$, T, $\tau_5$ and $\tau_6$ are as previously defined.

Signal 221 is provided from the feed forward model for reactor 11 block 202 as a second input to the summing block 215.

Signals 56a–c which are representative of a temperature profile of an upper portion of the reactor 11 are provided as inputs to the high select block 261. The highest temperature is selected by the high select block 261 and is provided as signal 262 as a first input to the controller block 263 and as a first input to the subtracting block 264. Signal 265, which is representative of the temperature limit for the upper portion of the reactor 11, is provided as a second input to the subtracting block 264 and is also supplied as a first input to the subtracting block 266. Signal 267, which is representative of the difference between the highest temperature in the upper portion of the reactor 11 and the highest allowable temperature in the upper portion of the reactor 11, is provided from the subtracting block 264 as a first input to the high select block 268. The set point signal 269, which is representative of a dead band, is provided as a second input to subtracting block 266.

The dead band signal 269 is utilized to prevent switching transients and is preferably representative of 5° C. Signal 270 from the subtracting block 266 is thus representative of the result of subtracting the dead band represented by signal 269 from the temperature limit represented by signal 265. Signal 270 is provided from the subtracting block 266 as a second input to the controller 263. In response to signals 262 and 270, the controller 263, which is a digital implementation of a proportional-integral controller, provides an output signal 272 which is responsive to the difference between signals 262 and 270. Signal 272 is representative of the temperature of the feed stream flowing to the reactor 11 which is required to maintain the reaction temperature in the upper portion of the reactor 11 below the temperature limit represented by signal 265. Signal 272 is provided from the controller 263 as a second input to the switching logic 232.

Signals 61a-c, which are representative of a temperature profile of a middle portion of the reactor 11, are provided as inputs to the high select block 281. The highest temperature is selected by the high select block 281 and is provided as signal 282 as a first input to the controller block 283 and as a first input to the subtracting block 284. Signal 285 which is representative of the temperature limit for the middle portion of the reactor 11, is provided as a second input to the subtracting block 284 and is also supplied as a first input to the subtracting block 286. Signal 287, which is representative of the difference between the highest temperature in the middle portion of the reactor 11 and the highest allowed temperature in the middle portion of the reactor 11, is provided from the subtracting block 284 as a second input to the high select block 268. The set point signal 289, which is representative of a dead band, is provided as a second input to subtracting block 286. The dead band signal 289 is utilized to prevent switching transients and is preferably representative of 5° C. Signal 290 from the subtracting block 286 is thus representative of the result of subtracting the dead band represented by signal 289 from the temperature limit represented by signal 285. Signal 290 is provided from the subtracting block 286 as a second input to the controller 283. In response to signals 282 and 290, the controller 283, which is a digital implementation of a proportional-integral controller, provides an output signal 292 which is responsive to the difference between signals 282 and 290. Signal 292 is representative of the temperature of the feed stream flowing to the reactor 11 which is required to maintain the reaction temperature in the middle portion of the reactor 11 below the temperature limit represented by signal 285. Signal 292 is provided from the controller 283 as a third input to the switching logic 232.

Signals 65a-c, which are representative of a temperature profile of a lower portion of the reactor 11, are provided as inputs to the high select block 301. The highest temperature is selected by the high select block 301 and is provided as signal 302 as a first input to the controller block 303 and as a first input to the subtracting block 304. Signal 305, which is representative of the temperature limit for the lower portion of the reactor 11, is provided as a second input to the subtracting block 304 and is also supplied as a first input to the subtracting block 306. Signal 307, which is representative of the difference between the highest temperature in the lower portion of the reactor 11 and the highest allowable temperature in the lower portion of the reactor 11, is provided from the subtracting block 304 as a third input to the high select block 268. The set point signal 309, which is representative of a dead band, is provided as a second input to subtracting block 306. The dead band signal 309 is utilized to prevent switching transients and is preferably representative of 5° C. Signal 310 from the subtracting block 306 is thus representative of the result of subtracting the dead band represented by signal 309 from the temperature limit represented by signal 305. Signal 310 is provided from the subtracting block 306 as a second input to the controller 303. In response to signals 302 and 310, the controller 303, which is a digital implementation of a proportional-integral controller, provides an output signal 312 which is responsive to the difference between signals 302 and 310. Signal 312 is representative of the temperature of the feed stream flowing to the reactor 11 which is required to maintain the reaction temperature in the lower portion of the reactor 11 below the temperature limit represented by signal 305. Signal 312 is provided from the controller 303 as a fourth input to the switching logic 232.

Signal 274 from the high select 268 is representative of the zone of the reactor 11 which has the greatest positive temperature difference between the highest temperature in that particular zone and the highest allowable temperature for that particular zone. If the largest difference between the actual temperatures in the reactor 11 and the limiting temperature for the reactor 11 are negative, then signal 231 is selected by the switching logic 232 to be provided as signal 111. If the largest difference between the temperatures in the reactor 11 and the temperature limits for the reactor 11 is positive, the temperature controller associated with this temperature difference is selected by the switching logic 232 to be provided as signal 111. Temperature control will remain in effect until all temperatures in reactor 11 are below their respective limit temperatures and the last temperature being controlled is below its limit temperature minus the dead band temperature represented by signals 269, 289 and 309.

Signal 105, which is representative of the concentration of acetylene in the product flowing from the reactor 12 through conduit means 19, is provided as a first input to the controller block 212. The controller block 212 is also provided with a second input signal 241 which is representative of the desired concentration of acetylene in the product flowing from the reactor 12 through conduit means 19. In response to signals 105 and 241, the controller block 212, which is a digital implementation of a proportional-integral controller, provides an output signal 211 which is responsive to the difference between signals 105 and 241. Signal 211 is representative of the temperature of the feed stream flowing to the reactor 12 required to maintain the concentration of the acetylene in the product stream flowing through conduit means 19 equal to or less than the concentration represented by signal 241. Signal 211 is provided from the controller 212 as a first input to the summing block 242 and is also provided as an input to the switching logic 208 as has been previously described.

The feed forward model for reactor 12 block 251 is provided with signals 34, 95 and 45 which are respectively representative of the concentration of acetylene in the feed stream flowing to the reactor 12, the concentration of carbon monoxide in the feed stream flowing to the reactor 11 and the flow rate of the feed stream flowing to the reactor 11. In response to signals 34, 95 and 45 the feed forward model for reactor 12 block 251 utilizes Equation (XIV), Equation (XVIII) and Equation (XXII) to calculate signal 252 which is representative of a prediction of any changes in the temperature of the feed stream flowing to the reactor 12 required to maintain a desired reaction temperature in the reactor 12. The prediction is based on changes in the concentration of carbon monoxide in the feed stream flowing to reactor 11 and/or a change in the flow rate of the feed stream flowing to the reactor 11 and/or a change in acetylene to reactor 12. The results of Equations (XIV), (XVIII) and (XXII) are combined to provide signal 252.

$$FF4(n)=[ARR(96)][FF4(n-1)] + [ARR(97)][DF(n-\theta_x)] + [ARR(98)][DF(n-\theta_x-1)] \quad \text{(XIV)}$$

where
- $FF4(n)$ = Feed forward contribution from feed rate changes to first reactor;
- $FF4(n-1) = FF4(n)$ from last program pass;
- $DF(n-\theta_x)$ = change in feed rate delayed by $\theta_x$ intervals;
- $DF(n-\theta_x-1) = DF(n-\theta_x)$ from last program pass;
- $ARR(96)$ = Tuning constant;
- $ARR(97)$ = Tuning constant;
- $ARR(98)$ = Tuning constant; and
- $\theta_x$ = Time required for a change in the feed rate to cause a change in the output of analyzer transducer 101.

The tuning constants $ARR(96)$, $ARR(97)$ and $ARR(98)$ are defined as follows:

$$ARR(96) = e^{-(T/\tau_7)} \quad \text{(XV)}$$

where
- $T$ = cycle time for the computer means 100; and
- $\tau_7$ = time required for 63% of the process response for reactor 12 to occur in response to a step change in the feed rate to reactor 11.

$$ARR(97) = (-K_7/K_8)(\tau_8/\tau_7) \quad \text{(XVI)}$$

where
- $\tau_8$ = time required for 63% of the process response for reactor 12 to occur in response to a step change in the temperature set point for temperature controller 134;
- $K_7$ = the change in the reaction temperature for reactor 12 caused by a change in the flow rate of the feed stream to reactor 11 divided by the change in the flow rate of the feed stream to reactor 11;
- $K_8$ = the change in the reaction temperature for reactor 12 caused by a change in the set point to temperature controller 134 divided by the change in the set point; and
- $\tau_7$ is as previously defined.

$$ARR(98) = \frac{K_7}{K_8}(e^{-\frac{T}{\tau_7}} + \tau_8/\tau_7 - 1) \quad \text{(XVII)}$$

where $K_7$, $K_8$, $T$, $\tau_7$ and $\tau_8$ are as previously defined.

$$FF5(n)=[ARR(126)][FF5(n-1)]+[ARR(127)]\cdot[DA(n-\theta_y)]+[ARR(128)][DA(n-\theta_y-1)] \quad \text{(XVIII)}$$

where
- $FF5(n)$ = Feed forward for change in the concentration of acetylene in feed to second reactor;
- $FF5(n-1) = FF5(n)$ from last program pass;
- $DA(n-\theta_y)$ = Change in the concentration of acetylene delayed by $\theta_y$ intervals;
- $DA(n-\theta_y-1) = DA(n-\theta_y)$ from last program pass;
- $ARR(126)$ = Tuning constant;
- $ARR(127)$ = Tuning constant;
- $ARR(128)$ = Tuning constant; and
- $\theta_y$ = Time required for a change in the concentration of acetylene to cause a change in the output of analyzer transducer 101.

The tuning constants $ARR(126)$, $ARR(127)$ and $ARR(128)$ are defined as follows:

$$ARR(126) = e^{-(T/\tau_9)}$$

where
- $T$ = cycle time for the computer means 100; and
- $\tau_9$ = time required for 63% of the process response for reactor 12 to occur in response to a step change in the concentration of acetylene in the feed to reactor 11.

$$ARR(127) = (-K_9/K_{10})(\tau_{10}/\tau_9) \quad \text{(XX)}$$

where
- $\tau_{10}$ = time required for 63% of the process response for reactor 12 to occur in response to a step change in the temperature set point for temperature controller 134;
- $K_9$ = the change in the reaction temperature for reactor 12 caused by a change in the acetylene concentration in the feed stream to reactor 11 divided by the change in the acetylene concentration in the feed stream to reactor 11;
- $K_{10}$ = the change in the reaction temperature for reactor 12 caused by a change in the set point to temperature controller 134 divided by the change in the set point; and
- $\tau_9$ is as previously defined.

$$ARR(128) = \frac{K_9}{K_{10}}(e^{-\frac{T}{\tau_9}} + \tau_{10}/\tau_9 - 1) \quad \text{(XXI)}$$

where $K_9$, $K_{10}$, $T$, $\tau_9$ and $\tau_{10}$ are as previously defined.

$$FF6(n)=[ARR(156)][FF6(n-1)] + [ARR(157)][DC(n-\theta_z)] + [ARR(158)][DC(n-\theta_z-1)] \quad \text{(XXII)}$$

where
- $FF6(n)$ = Feed forward for change in the concentration of carbon monoxide in feed to the first reactor;
- $FF6(n-1) = FF6(n)$ from last program pass;
- $DC(n-\theta_z)$ = Change in the concentration of carbon monoxide delayed by by $\theta_z$ intervals;
- $DC(n-\theta_z-1) = DC(n-\theta_z)$ from last program pass;
- $ARR(156)$ = Tuning constant;
- $ARR(157)$ = Tuning constant;
- $ARR(158)$ = Tuning constant; and
- $\theta_z$ = Time required for a change in the concentration of carbon monoxide to cause a change in the output of analyzer transducer 101.

The tuning constants $ARR(156)$, $ARR(157)$ and $ARR(158)$ are defined as follows:

$$ARR(156) = e^{-(T/\tau_{11})} \quad \text{(XXIII)}$$

where
T = cycle time for the computer means 100; and
$\tau_{11}$ = time required for 63% of the process response for reactor 11 to occur in response to a step change in the concentration of carbon monoxide in the feed to reactor 11.

$$ARR(157) = (-K_{11}/K_{12})(\tau_{12}/\tau_{11}) \qquad (XXIV)$$

where
$\tau_{12}$ = time required for 63% of the process response for reactor 12 to occur in response to a step change in the temperature set point for temperature controller 134;
$K_{11}$ = the change in the reaction temperature for reactor 12 caused by a change in the concentration of carbon monoxide in the feed stream to reactor 11 divided by the change in the concentration of carbon monoxide in the feed stream to reactor 11;
$K_{12}$ = the change in the reaction temperature for reactor 12 caused by a change in the set point to temperature controller 134 divided by the change in the set point; and
$\tau_{11}$ is as previously defined.

$$ARR(158) = \frac{K_{11}}{K_{12}} (e^{-\frac{T}{\tau_{11}}} + \tau_{12}/\tau_{11} - 1) \qquad (XXV)$$

where $K_{11}$, $K_{12}$, T, $\tau_{11}$ and $\tau_{12}$ are as previously defined.

Signal 252 is provided from the feed forward model for reactor 12 block 251 as a second input to the summing block 242.

Signals 76a-c, which are representative of a temperature profile of an upper portion of the reactor 12, are provided as inputs to the high select block 321. The highest temperature is selected by the high select block 321 and is provided as signal 322 as a first input to the controller block 323 and as a first input to the subtracting block 324. Signal 325, which is representative of the temperature limit for the upper portion of the reactor 12, is provided as a second input to the subtracting block 324 and is also supplied as a first input to the subtracting block 326. Signal 327, which is representative of the difference between the highest temperature in the upper portion of the reactor 12, and the highest allowable temperature in the upper portion of the reactor 12, is provided from the subtracting block 324 as a first input to the high select block 328. The set point signal 329, which is representative of a dead band, is provided as a second input to subtracting block 326. The dead band signal 329 is utilized to prevent switching transients and is preferably representative of 5° C. Signal 330 from the subtracting block 326 is thus representative of the result of subtracting the dead band represented by signal 329 from the temperature limit represented by signal 325. Signal 330 is provided from the subtracting block 326 as a second input to the controller 323. In response to signals 322 and 330, the controller 323, which is a digital implementation of a proportional-integral controller, provides an output signal 332 which is responsive to the difference between signals 322 and 330. Signal 322 is representative of the temperature of the feed stream flowing to the reactor 12 which is required to maintain the reaction temperature in the upper portion of the reactor 12 below the temperature limit represented by signal 325. Signal 332 is provided from the controller 323 as a second input to the switching logic 245.

Signals 81a-c, which are representative of a temperature profile of a middle portion of the reactor 12, are provided as inputs to the high select block 341. The highest temperature is selected by the high select block 341 and is provided as signal 342 as a first input to the controller block 343 and as a first input to the subtracting block 394. Signal 345, which is representative of the temperature limit for the middle portion of the reactor 12, is provided as a second input to the subtracting block 344 and is also supplied as a first input to the subtracting block 346. Signal 347, which is representative of the difference between the highest temperature in the middle portion of the reactor 12 and the highest allowed temperature in the middle portion of the reactor 12, is provided from the subtracting block 344 as a second input to the high select block 328. The set point signal 349, which is representative of a dead band, is provided as a second input to subtracting block 346. The dead band signal 349 is utilized to prevent switching transients and is preferably representative of 5° C. Signal 350 from the subtracting block 346 is thus representative of the result of subtracting the dead band represented by signal 349 from the temperature limit represented by signal 345. Signal 350 is provided from the subtracting block 346 as a second input to the controller 343. In response to signals 342 and 350, the controller 343, which is a digital implementation of a proportional-integral controller, provides an output signal 352 which is responsive to the difference between signals 342 and 350. Signal 352 is representative of the temperature of the feed stream flowing to the reactor 12 which is required to maintain the reaction temperature in the middle portion of the reactor 12 below the temperature limit represented by signal 345. Signal 352 is provided from the controller 343 as a third input to the switching logic 245.

Signals 85a-c, which are representative of a temperature profile of a lower portion of the reactor 12, are provided as inputs to the high select block 361. The highest temperature is selected by the high select block 361 and is provided as signal 362 as a first input to the controller block 363 and as a first input to the subtracting block 364. Signal 365, which is representative of the temperature limit for the lower portion of the reactor 12, is provided as a second input to the subtracting block 364 and is also supplied as a first input to the subtracting block 366. Signal 377, which is representative of the difference between the highest temperature in the lower portion of the reactor 12 and the highest allowable temperature in the lower portion of the reactor 12, is provided from the subtracting block 364 as a third input to the high select block 328. The set point signal 369, which is representative of a dead band, is provided as a second input to subtracting block 366. The dead band signal 369 is utilized to prevent switching transients and is preferably representative of 5° C. Signal 370 from the subtracting block 366 is thus representative of the result of subtracting the dead band represented by signal 369 from the temperature limit represented by signal 365. Signal 370 is provided from the subtractng block 366 as a second input to the controller 363. In response to signals 362 and 370, the controller 363, which is a digital implementation of a proportional-integral controller, provides an output signal 372 which is responsive to the difference between signals 362 and 370. Signal 372 is representative of the temperature of the feed stream flowing to the reactor 12 which is required to maintain the reaction temperature in the lower portion of the reactor 12 below the temperature limit represented by signal 365. Signal 372 is provided from the controller 363 as a fourth input to the switching logic 245.

Signal 334 from the high select 328 is representative of the zone of the reactor 12 which has the greatest positive temperature difference between the highest temperature in that particular zone and the highest allowable temperature for that particular zone. If the largest difference between the actual temperatures in the reactor 12 and the limiting temperature for the reactor 12 are negative, then signal 244 is selected by the switching logic 245 to be provided as signal 131. If the largest difference between the temperatures in the reactor 12 and the temperature limits for the reactor 12 is positive, the temperature controller associated with this temperature difference is selected by the switching logic 245 to be provided as signal 131. Temperature control will remain in effect until all temperatures in reactor 12 are below their respective limit temperatures and the last temperature being controlled is below its limit temperature minus the dead band temperature represented by signals 329, 349 and 369.

The control system illustrated in FIGS. 1 and 2 provides both feed forward and feed back control of the temperature of the feed stream flowing to the reactor 11 and the temperature of the feed stream flowing to the reactor 12. Feed forward control is provided by the feed forward model for reactor 11 block 202 and the feed forward model for reactor 12 block 251. These models provide predictions of temperature changes needed to compensate for changes in either the concentration of acetylene or carbon monoxide in the feed stream flowing to reactor 11 or changes in the flow rate of the feed stream flowing to the reactor 11. Feed back control for the reactor 11 is provided by the comparison of the actual percent conversion of acetylene in the reactor 11 to the desired percent conversion of acetylene in reactor 11. Feed back control for the reactor 12 is provided by a comparison of the actual concentration of acetylene in the product stream flowing through conduit means 19 with the desired concentration of acetylene in the product stream flowing through conduit means 19. This combination of feed forward and feed back control allows close control of the acetylene concentration specification for the product stream and also allows close control of the temperatures of reactors 11 and 12 which avoids dangerous conditions.

The invention has been described in terms of a preferred embodiment as illustrated in FIGS. 1, 2a and 2b. Specific components used in the practice of the invention as illustrated in FIG. 1 such as flow sensor 42; flow transducer 41; temperature transducers 51, 52, 53, 71, 72, 73, 115 and 135; temperature controllers 134 and 114; pneumatic control valves 21 and 28; and current to pressure transducers 118 and 138 are each well known, commercially available control components such as are described at length in Perry's Chemical Engineers' Handbook, 4th Edition, Chapter 22, McGraw-Hill.

Other components not previously specified are as follows:

| | |
|---|---|
| A/D converters 33,36,44,55,59,64, 94,75,79,84 and 104 | MM5357 8 bit A/D converter National Semiconductor |
| D/A converters 112 and 132 | AD 559 8 bit D/A converter Analog Devices |
| Analyzer transducers 91 and 101 | 102 Process Chromatograph System, Applied Automation, Bartlesville, Oklahoma |

For reasons of brevity, conventional auxiliary equipment commonly used in selective hydrogenation processes such as pumps, heat exchangers, additional measurement-control devices, etc., have not been included in the above description as they play no part in the explanation of the invention.

While the invention has been described in terms of the presently preferred embodiments, reasonable variations and modifications within the scope of the described invention and the appended claims are possible by those skilled in the art. Variations such as using an analog computer to perform the required calculations are within the scope of the invention. Other variations, such as having two catalyst beds in a single reactor, are within the scope of the invention as long as an analysis can be performed of the feed stream flowing between the two catalyst beds and control can be exerted over the temperature of the feed stream flowing between the two catalyst beds.

That which is claimed is:

1. Apparatus comprising:

a first catalyst bed;

means for supplying a first feed stream containing a first constituent to said first catalyst bed, a portion of said first constituent in said first feed stream being removed from said first feed stream in said first catalyst bed;

a second catalyst bed;

means for withdrawing the reaction effluent from said first catalyst bed as a first product stream and for supplying said first product stream as a second feed stream to said second catalyst bed, a portion of said first constituent in said second feed stream being removed from said second feed stream in said second catalyst bed;

means for withdrawing the reaction effluent, containing a substantially reduced concentration of said first constituent, from said second catalyst bed as a second product stream;

means for establishing a first signal representative of the percentage of said first constituent removed from said first feed stream in said first catalyst bed;

means for establishing a second signal representative of the percentage of said first constituent which is desired to be removed from said first feed stream in said first catalyst bed;

means for comparing said first signal and said second signal and for establishing a third signal responsive to the difference between said first signal and said second signal;

means for establishing a fourth signal representative of a prediction of the temperature change for said first feed stream required to compensate for changes in the flow rate of said first feed stream and changes in the concentration of said first constituent in said first feed stream so as to maintain said first signal substantially equal to said second signal;

means for combining said third signal and said fourth signal to establish a fifth signal representative of the temperature of said first feed stream required to maintain said first signal substantially equal to said second signal; and means for manipulating the temperature of said first feed stream in response to said fifth signal.

2. Apparatus in accordance with claim 1 wherein said means for establishing said first signal comprises:

means for establishing a sixth signal representative of the concentration of said first constituent in said first feed stream;

means for establishing a seventh signal representative of the concentration of said first constituent in said first product stream; and means, responsive to said sixth and seventh signals, for establishing said first signal.

3. Apparatus in accordance with claim 2 wherein said means for establishing said first signal in response to said sixth and seventh signals comprises:

means for establishing an eighth signal representative of the constant 10,000;

means for multiplying said eighth signal by said seventh signal to establish a ninth signal;

means for dividing said sixth signal by said ninth signal to establish a tenth signal;

means for establishing an eleventh signal representative of the constant +1.0;

means for subtracting said tenth signal from said eleventh signal to establish a twelfth signal;

means for establishing a thirteenth signal representative of the constant 100.0; and means for multiplying said twelfth signal by said thirteenth signal to establish said first signal.

4. Apparatus in accordance with claim 1 wherein said means for establishing said fourth signal comprises:

means for establishing a sixth signal representative of the concentration of said first constituent in said first feed stream;

means, responsive to said sixth signal, for establishing a seventh signal representative of a prediction of the temperature change for said first feed stream required to compensate for changes in the concentration of said first constituent in said first feed stream;

means for establishing an eighth signal representative of the flow rate of said first feed stream;

means, responsive to said eighth signal, for establishing a ninth signal representative of a prediction of the temperature change for said first feed stream required to compensate for changes in the flow rate of said first feed stream; and means for combining said seventh signal and said ninth signal to establish said fourth signal.

5. Apparatus in accordance with claim 1 wherein said means for combining said third signal and said fourth signal to establish said fifth signal comprises a summing means.

6. Apparatus in accordance with claim 1 wherein said means for manipulating the temperature of said first feed stream in response to said fifth signal comprises:

a first heat exchanger means operably located in said means for supplying said first feed stream;

means for supplying a heating fluid to said first heat exchanger means;

bypass conduit means for bypassing at least a portion of said first feed stream around said first heat exchanger means;

means for establishing a sixth signal representative of the temperature of said first feed stream;

means for comparing said fifth signal and said sixth signal and for establishing a seventh signal responsive to the difference between said fifth signal and said sixth signal; and means for manipulating the flow rate of said first feed stream through said bypass conduit means in response to said seventh signal to thereby manipulate the temperature of said first feed stream supplied to said first catalyst bed.

7. Apparatus in accordance with claim 1 additionally comprising means for establishing a sixth signal representative of the concentration of a second constituent in said first feed stream, said second constituent being a constituent which tends to poison the catalyst in said first catalyst bed and said second catalyst bed.

8. Apparatus in accordance with claim 7 wherein said means for establishing said fourth signal comprises:

means for establishing a seventh signal representative of the concentration of said first constituent in said first feed stream;

means, responsive to said seventh signal, for establishing an eighth signal representative of a prediction of the temperature change for said first feed stream required to compensate for changes in the concentration of said first constituent in said first feed stream;

means for establishing a ninth signal representative of the flow rate of said first feed stream;

means, responsive to said ninth signal, for establishing a tenth signal representative of a prediction of the temperature change for said first feed stream required to compensate for changes in the flow rate of said first feed stream;

means, responsive to said sixth signal, for establishing an eleventh signal representative of a prediction of the temperature change for said first feed stream required to compensate for a change in the concentration of said second constituent in said first feed stream; and means for combining said eighth signal, said tenth signal and said eleventh signal to establish said fourth signal.

9. Apparatus in accordance with claim 1 additionally comprising:

means for establishing at least one sixth signal representative of the reaction temperature in at least one zone of said first catalyst bed;

means for establishing a seventh signal representative of the highest allowable temperature for said at least one zone of said first catalyst bed;

means for comparing said sixth signal and said seventh signal and for establishing an eighth signal responsive to the difference between said sixth signal and said seventh signal; and means for overriding the control of the temperature of said first feed stream in response to said fifth signal to allow the temperature of said first feed stream to be manipulated in response to said eighth signal if the temperature represented by said sixth signal exceeds the temperature represented by said seventh signal.

10. Apparatus in accordance with claim 1 additionally comprising:

means for establishing a plurality of sixth signals representative of a temperature profile of an upper zone of said first catalyst bed;

means for selecting the one of said plurality of sixth signals which is representative of the highest temperature;

means for establishing a seventh signal representative of the highest allowable temperature in said upper zone of said first catalyst bed;

means for comparing the one of said plurality of sixth signals, which is representative of the highest temperature, to said seventh signal and for establishing an eighth signal responsive to the difference between said seventh signal and the one of said plurality of sixth signals which is representative of the highest temperature;

means for subtracting said seventh signal from the one of said plurality of sixth signals which is representative of the highest temperature to establish a ninth signal;

means for establishing a plurality of tenth signals representative of a temperature profile of a central zone of said first catalyst bed;

means for selecting the one of said plurality of tenth signals which is representative of the highest temperature;

means for establishing an eleventh signal representative of the highest allowable temperature in said central zone of said first catalyst bed;

means for comparing the one of said plurality of tenth signals, which is representative of the highest temperature, to said eleventh signal and for establishing a twelfth signal responsive to the difference between said eleventh signal and the one of said plurality of tenth signals which is representative of the highest temperature;

means for subtracting said eleventh signal from the one of said plurality of tenth signals which is representative of the highest temperature to establish a thirteenth signal;

means for establishing a plurality of fourteenth signals representative of a temperature profile of a lower zone of said first catalyst bed;

means for selecting the one of said plurality of fourteenth signals which is representative of the highest temperature;

means for establishing a fifteenth signal representative of the highest allowable temperature in said lower zone of said first catalyst bed;

means for comparing the one of said plurality of fourteenth signals, which is representative of the highest temperature, to said fifteenth signal and for establishing a sixteenth signal responsive to the difference between said fifteenth signal and the one of said plurality of fourteenth signals which is representative of the highest temperature;

means for subtracting said fifteenth signal from the one of said plurality of sixth signals which is representative of the highest temperature to establish a seventeenth signal;

means for overriding the control of the temperature of said first feed stream in response to said fifth signal to allow the temperature of said first feed stream to be manipulated in response to said eighth signal if said ninth signal is positive and if said ninth signal is representative of a larger positive value than said thirteenth signal or said seventeenth signal;

means for overriding the control of the temperature of said first feed stream in response to said fifth signal to allow the temperature of said first feed stream to be manipulated in response to said twelfth signal if said thirteenth signal is positive and if said thirteenth signal is representative of a larger positive value than said ninth signal or said seventeenth signal; and means for overriding the control of the temperature of said first feed stream in response to said fifth signal to allow the temperature of said first feed stream to be manipulated in response to said sixteenth signal if said seventeenth signal is positive and if said seventeenth signal is representative of a larger positive value than said ninth signal or said thirteenth signal.

11. Apparatus in accordance with claim 1 additionally comprising:

means for establishing a sixth signal representative of the concentration of said first constituent in said second product stream;

means for establishing a seventh signal representative of the desired concentration of said first constituent in said second product stream;

means for comparing said sixth signal and said seventh signal and for establishing an eighth signal responsive to the difference between said sixth signal and said seventh signal;

means for establishing a ninth signal representative of a prediction of a temperature change for said second feed stream required to compensate for changes in the flow rate of said first feed stream and changes in the concentration of said first constituent in said first feed stream so as to maintain said sixth signal substantially equal to or less than said seventh signal;

means for combining said eighth signal and said ninth signal to establish a tenth signal representative of the temperature of said second feed stream required to maintain said sixth signal substantially equal to or less than said seventh signal; and means for manipulating the temperature of said second feed stream in response to said tenth signal.

12. Apparatus in accordance with claim 11 wherein said means for establishing said ninth signal comprises:

means for establishing an eleventh signal representative of the concentration of said first constituent in said first feed stream;

means, responsive to said eleventh signal, for establishing a twelfth signal representative of a prediction of the temperature change for said second feed stream required to compensate for changes in the concentration of said first constituent in said first feed stream;

means for establishing a thirteenth signal representative of the flow rate of said first feed stream;

means, responsive to said thirteenth signal, for establishing a fourteenth signal representative of a prediction of the temperature change for said second feed stream required to compensate for changes in the flow rate of said first feed stream; and means for combining said twelfth signal and said fourteenth signal to establish said ninth signal.

13. Apparatus in accordance with claim 11 wherein said means for combining said eighth signal and said ninth signal to establish said tenth signal comprises a summing means.

14. Apparatus in accordance with claim 11 wherein said means for manipulating the temperature of said second feed stream in response to said tenth signal comprises:

a second heat exchanger means operably located in said means for supplying said second feed stream;

means for supplying a heating fluid to said second heat exchanger means;

bypass conduit means for bypassing at least a portion of said second feed stream around said second heat exchanger means;

means for establishing an eleventh signal representative of the temperature of said second feed stream;

means for comparing said tenth signal and said eleventh signal and for establishing a twelfth signal responsive to the difference between said tenth signal and said eleventh signal; and means for manipulating the flow rate of said second feed stream through said bypass conduit means in response to said twelfth signal to thereby manipulate the temperature of said second feed stream supplied to said second catalyst bed.

15. Apparatus in accordance with claim 11 additionally comprising means for establishing an eleventh signal representative of the concentration of a second constituent in said first feed stream, said second constituent being a constituent which tends to poison the catalyst in said first catalyst bed and said second catalyst bed.

16. Apparatus in accordance with claim 15 wherein said means for establishing said ninth signal comprises:
means for establishing a twelfth signal representative of the concentration of said first constituent in said first feed stream;

means, responsive to said twelfth signal, for establishing a thirteenth signal representative of a prediction of the temperature change for said second feed stream required to compensate for changes in the concentration of said first constituent in said first feed stream;

means for establishing a fourteenth signal representative of the flow rate of said first feed stream;

means, responsive to said fourteenth signal for establishing a fifteenth signal representative of a prediction of the temperature change for said second feed stream required to compensate for changes in the flow rate of said first feed stream;

means, responsive to said eleventh signal, for establishing a sixteenth signal representative of a prediction of the temperature change for said second feed stream required to compensate for a change in the concentration of said second constituent in said first feed stream; and means for combining said thirteenth signal, said fifteenth signal and said sixteenth signal to establish said ninth signal.

17. Apparatus in accordance with claim 11 additionally comprising:
means for establishing at least one eleventh signal representative of the reaction temperature in at least one zone of said second catalyst bed;

means for establishing a twelfth signal representative of the highest allowable temperature for said at least one zone of said second catalyst bed;

means for comparing said eleventh signal and said twelfth signal and for establishing a thirteenth signal responsive to the difference between said eleventh signal and said twelfth signal; and means for overriding the control of the temperature of said second feed stream in response to said tenth signal to allow the temperature of said second feed stream to be manipulated in response to said thirteenth signal if the temperature represented by said eleventh signal exceeds the temperature represented by said twelfth signal.

18. Apparatus in accordance with claim 11 additionally comprising:
means for establishing a plurality of eleventh signals representative of a temperature profile of an upper zone of said second catalyst bed;

means for selecting the one of said plurality of eleventh signals which is representative of the highest temperature;

means for establishing a twelfth signal representative of the highest allowable temperature in said upper zone of said second catalyst bed;

means for comparing the one of said plurality of eleventh signals, which is representative of the highest temperature, to said twelfth signal and for establishing a thirteenth signal responsive to the difference between said seventh signal and the one of said plurality of eleventh signals which is representative of the highest temperature;

means for subtracting said twelfth signal from the one of said plurality of sixth signals which is representative of the highest temperature to establish a fourteenth signal;

means for establishing a plurality of fifteenth signals representative of a temperature profile of a central zone of said second catalyst bed;

means for selecting the one of said plurality of fifteenth signals which is representative of the highest temperature;

means for establishing a sixteenth signal representative of the highest allowable temperature in said central zone of said second catalyst bed;

means for comparing the one of said plurality of fifteenth signals which is representative of the highest temperature to said sixteenth signal and for establishing a seventeenth signal responsive to the difference between said sixteenth signal and the one of said plurality of fifteenth signals which is representative of the highest temperature;

means for establishing an eighteenth signal representative of the difference between the one of said plurality of fifteenth signals which is representative of the highest temperature and said sixteenth signal;

means for establishing a plurality of nineteenth signals representative of a temperature profile of a lower zone of said second catalyst bed;

means for selecting the one of said plurality of nineteenth signals which is representative of the highest temperature;

means for establishing a twentieth signal representative of the highest allowable temperature in said lower zone of said second catalyst bed;

means for comparing the one of said plurality of nineteenth signals which is representative of the highest temperature to said twentieth signal and for establishing a twenty-first signal responsive to the difference between said twentieth signal and the one of said plurality of nineteenth signals which is representative of the highest temperature;

means for subtracting said twentieth signal from the one of said plurality of sixth signals which is representative of the highest temperature to establish a twenty-second signal;

means for overriding the control of the temperature of said second feed stream in response to said tenth signal to allow the temperature of said second feed stream to be manipulated in response to said thirteenth signal if said fourteenth signal is positive and if said fourteenth signal is representative of a larger positive value than said eighteenth signal or said twenty-second signal;

means for overriding the control of the temperature of said second feed stream in response to said tenth signal to allow the temperature of said second feed stream to be manipulated in response to said sixteenth signal if said seventeenth signal is positive and if said seventeenth signal is representative of a larger positive value than said fourteenth signal or said twenty-second signal; and means for overriding the control of the temperature of said second feed stream in response to said tenth signal to allow the temperature of said second feed stream to be manipulated in response to said twenty-first signal if said twenty-second signal is positive and if said twenty-second signal is representative of a larger positive value than said fourteenth signal or said eighteenth signal.

19. A method for removing a first constituent in a feed stream comprising the steps of:

supplying a first feed stream containing said first constituent to a first reaction zone, a portion of said first constituent in said first feed stream being removed from said first feed stream in said first reaction zone;

withdrawing the reaction effluent from said first reaction zone as a first product stream and supplying said first product stream as a second feed stream to said second reaction zone, a portion of said first constituent in said second feed stream being removed from said second feed stream in said second reaction zone;

withdrawing the reaction effluent, containing a substantially reduced concentration of said first constituent, from said second reaction zone as a second product stream;

establishing a first signal representative of the percentage of said first constituent removed from said first feed stream in said first reaction zone;

establishing a second signal representative of the percentage of said first constituent which is desired to be removed from said first feed stream in said first reaction zone;

comparing said first signal and said second signal and establishing a third signal responsive to the difference between said first signal and said second signal;

establishing a fourth signal representative of a prediction of the temperature change for said first feed stream required to compensate for changes in the flow rate of said first feed stream and changes in the concentration of said first constituent in said first feed stream so as to maintain said first signal substantially equal to said second signal;

combining said third signal and said fourth signal to establish a fifth signal representative of the temperature of said first feed stream required to maintain said first signal substantially equal to said second signal; and manipulating the temperature of said first feed stream in response to said fifth signal.

20. A method in accordance with claim 19 wherein said step of establishing said first signal comprises:

establishing a sixth signal representative of the concentration of said first constituent in said first feed stream;

establishing a seventh signal representative of the concentration of said first constituent in said first product stream; and establishing said first signal responsive to said sixth and seventh signals.

21. A method in accordance with claim 20 wherein said step of establishing said first signal in response to said sixth and seventh signals comprises:

establishing an eighth signal representative of the constant 10,000;

multiplying said eighth signal by said seventh signal to establish a ninth signal;

dividing said sixth signal by said ninth signal to establish a tenth signal;

establishing an eleventh signal representative of the constant $+1.0$;

subtracting said tenth signal from said eleventh signal to establish a twelfth signal;

establishing a thirteenth signal representative of the constant 100.0; and multiplying said twelfth signal by said thirteenth signal to establish said first signal.

22. A method in accordance with claim 19 wherein said step of establishing said fourth signal comprises:

establishing a sixth signal representative of the concentration of said first constituent in said first feed stream;

responsive to said sixth signal, establishing a seventh signal representative of a prediction of the temperature change for said first feed stream required to compensate for changes in the concentration of said first constituent in said first feed stream;

establishing an eighth signal representative of the flow rate of said first feed stream;

responsive to said eighth signal, establishing a ninth signal representative of a prediction of the temperature change for said first feed stream required to compensate for changes in the flow rate of said first feed stream; and combining said seventh signal and said ninth signal to establish said fourth signal.

23. A method in accordance with claim 19 wherein said step of combining said third signal and said fourth signal to establish said fifth signal comprises summing said third signal and said fourth signal.

24. A method in accordance with claim 19 wherein said step of manipulating the temperature of said first feed stream in response to said fifth signal comprises:

supplying said first feed stream through a first heat exchanger means;

supplying a heating fluid to said first heat exchanger means;

bypassing at least a portion of said first feed stream around said first heat exchanger means;

establishing a sixth signal representative of the temperature of said first feed stream;

comparing said fifth signal and said sixth signal and establishing a seventh signal responsive to the difference between said fifth signal and said sixth signal; and manipulating the flow rate of said first feed stream through said bypass conduit means in response to said seventh signal to thereby manipulate the temperature of said first feed stream supplied to said first reaction zone.

25. A method in accordance with claim 19 additionally comprising the step of establishing a sixth signal representative of the concentration of a second constituent in said first feed stream, said second constituent being a constituent which tends to poison the catalyst in said first reaction zone and said second reaction zone.

26. A method in accordance with claim 25 wherein said step of establishing said fourth signal comprises:
establishing a seventh signal representative of the concentration of said first constituent in said first feed stream;
responsive to said seventh signal, establishing an eighth signal representative of a prediction of the temperature change for said first feed stream required to compensate for changes in the concentration of said first constituent in said first feed stream;
establishing a ninth signal representative of the flow rate of said first feed stream;
responsive to said ninth signal, establishing a tenth signal representative of a prediction of the temperature change for said first feed stream required to compensate for changes in the flow rate of said first feed stream;
responsive to said sixth signal, establishing an eleventh signal representative of a prediction of the temperature change for said first feed stream required to compensate for a change in the concentration of said second constituent in said first feed stream; and
combining said eighth signal, said tenth signal and said eleventh signal to establish said fourth signal.

27. A method in accordance with claim 19 additionally comprising the steps of:
establishing at least one sixth signal representative of the reaction temperature in at least one zone of said first reaction zone;
establishing a seventh signal representative of the highest allowable temperature for said at least one zone of said first reaction zone;
comparing said sixth signal and said seventh signal and establishing an eighth signal responsive to the difference between said sixth signal and said seventh signal; and
overriding the control of the temperature of said first feed stream in response to said fifth signal to allow the temperature of said first feed stream to be manipulated in response to said eighth signal if the temperature represented by said sixth signal exceeds the temperature represented by said seventh signal.

28. A method in accordance with claim 19 additionally comprising the steps of:
establishing a plurality of sixth signals representative of a temperature profile of an upper zone of said first reaction zone;
selecting the one of said plurality of sixth signals which is representative of the highest temperature;
establishing a seventh signal representative of the highest allowable temperature in said upper zone of said first reaction zone;
comparing the one of said plurality of sixth signals, which is representative of the highest temperature, to said seventh signal and establishing an eighth signal responsive to the difference between said seventh signal and the one of said plurality of sixth signals which is representative of the highest temperature;
subtracting said seventh signal from the one of said plurality of sixth signals which is representative of the highest temperature to establish a ninth signal;
establishing a plurality of tenth signals representative of a temperature profile of a central zone of said first reaction zone;
selecting the one of said plurality of tenth signals which is representative of the highest temperature;
establishing an eleventh signal representative of the highest allowable temperature in said central zone of said first reaction zone;
comparing the one of said plurality of tenth signals, which is representative of the highest temperature, to said eleventh signal and establishing a twelfth signal responsive to the difference between said eleventh signal and the one of said plurality of tenth signals which is representative of the highest temperature;
subtracting said eleventh signal from the one of said plurality of tenth signals which is representative of the highest temperature to establish a thirteenth signal;
establishing a plurality of fourteenth signals representative of a temperature profile of a lower zone of said first reaction zone;
selecting the one of said plurality of fourteenth signals which is representative of the highest temperature;
establishing a fifteenth signal representative of the highest allowable temperature in said lower zone of said first reaction zone;
comparing the one of said plurality of fourteenth signals, which is representative of the highest temperature, to said fifteenth signal and establishing a sixteenth signal responsive to the difference between said seventh signal and the one of said plurality of fourteenth signals which is representative of the highest temperature;
subtracting said fifteenth signal from the one of said plurality of fourteenth signals which is representative of the highest temperature to establish a seventeenth signal;
overriding the control of the temperature of said first feed stream in response to said fifth signal to allow the temperature of said first feed stream to be manipulated in response to said eighth signal if said ninth signal is positive and if said ninth signal is representative of a larger positive value than said thirteenth signal or said seventeenth signal;
overriding the control of the temperature of said first feed stream in response to said fifth signal to allow the temperature of said first feed stream to be manipulated in response to said twelfth signal if said thirteenth signal is positive and if said thirteenth signal is representative of a larger positive value than said ninth signal or said seventeenth signal; and
overriding the control of the temperature of said first feed stream in response to said fifth signal to allow the temperature of said first feed stream to be manipulated in response to said sixteenth signal if said seventeenth signal is positive and if said seventeenth signal is representative of a larger positive value than said thirteenth signal or said ninth signal.

29. A method in accordance with claim 19 additionally comprising the steps of:

establishing a sixth signal representative of the concentration of said first constituent in said second product stream;

establishing a seventh signal representative of the desired concentration of said first constituent in said second product stream;

comparing said sixth signal and said seventh signal and establishing an eighth signal responsive to the difference between said sixth signal and said seventh signal;

establishing a ninth signal representative of a prediction of a temperature change for said second feed stream required to compensate for changes in the flow rate of said first feed stream and changes in the concentration of said first constituent in said first feed stream so as to maintain said sixth signal substantially equal to or less than said seventh signal;

combining said eighth signal and said ninth signal to establish a tenth signal representative of the temperature of said second feed stream required to maintain said sixth signal substantially equal to or less than said seventh signal; and manipulating the temperature of said second feed stream in response to said tenth signal.

30. A method in accordance with claim 29 wherein said step of establishing said ninth signal comprises:

establishing an eleventh signal representative of the concentration of said first constituent in said first feed stream;

responsive to said eleventh signal, establishing a twelfth signal representative of a prediction of the temperature change for said second feed stream required to compensate for changes in the concentration of said first constituent in said first feed stream;

establishing a thirteenth signal representative of the flow rate of said first feed stream;

responsive to said eighth signal, establishing a fourteenth signal representative of a prediction of the temperature change for said second feed stream required to compensate for changes in the flow rate of said first feed stream; and combining said twelfth signal and said fourteenth signal to establish said ninth signal.

31. A method in accordance with claim 29 wherein said step of combining said eighth signal and said ninth signal to establish said tenth signal comprises summing said eighth signal and said ninth signal.

32. A method in accordance with claim 29 wherein said step of manipulating the temperature of said second feed stream in response to said tenth signal comprises:

supplying said first feed stream through a second heat exchanger means;

supplying a heating fluid to said second heat exchanger means;

bypassing at least a portion of said first feed stream around said second heat exchanger means;

establishing an eleventh signal representative of the temperature of said second feed stream;

comparing said tenth signal and said eleventh signal and establishing a twelfth signal responsive to the difference between said tenth signal and said eleventh signal; and manipulating the flow rate of said second feed stream through said bypass conduit means in response to said twelfth signal to thereby manipulate the temperature of said second feed stream supplied to said first reaction zone.

33. A method in accordance with claim 29 additionally comprising the step of establishing an eleventh signal representative of the concentration of a second constituent in said first feed stream, said second constituent being a constituent which tends to poison the catalyst in said first reaction zone and said second reaction zone.

34. A method in accordance with claim 33 wherein said step of establishing said ninth signal comprises:

establishing a twelfth signal representative of the concentration of said first constituent in said first feed stream;

responsive to said twelfth signal, establishing a thirteenth signal representative of a prediction of the temperature change for said second feed stream required to compensate for changes in the concentration of said first constituent in said first feed stream;

establishing a fourteenth signal representative of the flow rate of said first feed stream;

responsive to said fourteenth signal, establishing a fifteenth signal representative of a prediction of the temperature change for said second feed stream required to compensate for changes in the flow rate of said first feed stream;

responsive to said eleventh signal, establishing a sixteenth signal representative of a prediction of the temperature change for said second feed stream required to compensate for a change in the concentration of said second constituent in said first feed stream; and combining said thirteenth signal, said fifteenth signal and said sixteenth signal to establish said ninth signal.

35. A method in accordance with claim 29 additionally comprising the steps of:

establishing at least one eleventh signal representative of the reaction temperature in at least one zone of said second reaction zone;

establishing a twelfth signal representative of the highest allowable temperature for said at least one zone of said second reaction zone;

comparing said eleventh signal and said twelfth signal and establishing a thirteenth signal responsive to the difference between said eleventh signal and said twelfth signal; and overriding the control of the temperature of said second feed stream in response to said tenth signal to allow the temperature of said second feed stream to be manipulated in response to said thirteenth signal if the temperature represented by said eleventh signal exceeds the temperature represented by said twelfth signal.

36. A method in accordance with claim 29 additionally comprising the steps of:

establishing a plurality of eleventh signals representative of a temperature profile of an upper zone of said second reaction zone;

selecting the one of said plurality of eleventh signals which is representative of the highest temperature;

establishing a twelfth signal representative of the highest allowable temperature in said upper zone of said second reaction zone;

comparing the one of said plurality of eleventh signals, which is representative of the highest temperature, to said twelfth signal and establishing a thirteenth signal responsive to the difference between said twelfth signal and the one of said plurality of eleventh signals which is representative of the highest temperature;

subtracting said twelfth signal from the one of said plurality of eleventh signals which is representative of the highest temperature to establish a fourteenth signal;

establishing a plurality of fifteenth signals representative of a temperature profile of a central zone of said second reaction zone;

selecting the one of said plurality of fifteenth signals which is representative of the highest temperature;

establishing a sixteenth signal representative of the highest allowable temperature in said central zone of said second reaction zone;

comparing the one of said plurality of fifteenth signals, which is representative of the highest temperature, to said sixteenth signal and establishing a seventeenth signal responsive to the difference between said sixteenth signal and the one of said plurality of fifteenth signals which is representative of the highest temperature;

substracting said sixteenth signal from the one of said plurality of fifteenth signals which is representative of the highest temperature to establish an eighteenth signal;

establishing a plurality of nineteenth signals representative of a temperature profile of a lower zone of said second reaction zone;

selecting the one of said plurality of nineteenth signals which is representative of the highest temperature;

establishing a twentieth signal representative of the highest allowable temperature in said lower zone of said second reaction zone;

comparing the one of said plurality of nineteenth signals, which is representative of the highest temperature, to said twentieth signal and establishing a twenty-first signal responsive to the difference between said twentieth signal and the one of said plurality of nineteenth signals which is representative of the highest temperature;

subtracting said twentieth signal from the one of said plurality of nineteenth signals which is representative of the highest temperature to establish a twenty-second signal;

overriding the control of the temperature of said second feed stream in response to said tenth signal to allow the temperature of said second feed stream to be manipulated in response to said thirteenth signal if said fourteenth signal is positive and if said fourteenth signal is representative of a larger positive value than said eighteenth signal or said twenty-second signal; and overriding the control of the temperature of said second feed stream in response to said tenth signal to allow the temperature of said second feed stream to be manipulated in response to said twenty-first signal if said twenty-second signal is positive and if said twenty-second signal is representative of a larger positive value than said fourteenth signal or said eighteenth signal.

37. Apparatus comprising:
a first catalyst bed;
means for supplying a first feed stream containing a first constituent to said first catalyst bed, a portion of said first constituent in said first feed stream being removed from said first feed stream in said first catalyst bed;

a second catalyst bed;

means for withdrawing the reaction effluent from said first catalyst bed as a first product stream and for supplying said first product stream as a second feed stream to said second catalyst bed, a portion of said first constituent in said second feed stream being removed from said second feed stream in said second catalyst bed;

means for withdrawing the reaction effluent, containing a substantially reduced concentration of said first constituent, from said second catalyst bed as a second product stream;

means for establishing a first signal representative of the concentration of said first constituent in said second product stream;

means for establishing a second signal representative of the desired concentration of said first constituent in said second product stream;

means for comparing said first signal and said second signal and for establishing a third signal responsive to the difference between said first signal and said second signal;

means for establishing a fourth signal representative of a prediction of a temperature change for said second feed stream required to compensate for changes in the flow rate of said first feed stream and changes in the concentration of said first constituent in said first feed stream so as to maintain said first signal substantially equal to or less than said second signal;

means for combining said third signal and said fourth signal to establish a fifth signal representative of the temperature of said second feed stream required to maintain said first signal substantially equal to or less than said second signal; and means for manipulating the temperature of said second feed stream in response to said fifth signal.

38. Apparatus in accordance with claim 37 wherein said means for establishing said fourth signal comprises:
means for establishing a sixth signal representative of the concentration of said first constituent in said first feed stream;

means, responsive to said sixth signal, for establishing a seventh signal representative of a prediction of the temperature change for said second feed stream required to compensate for changes in the concentration of said first constituent in said first feed stream;

means for establishing an eighth signal representative of the flow rate of said first feed stream;

means, responsive to said eighth signal, for establishing a ninth signal representative of a prediction of the temperature change for said second feed stream required to compensate for changes in the flow rate of said first feed stream; and means for combining said seventh signal and said ninth signal to establish said fourth signal.

39. Apparatus in accordance with claim 38 wherein said means for combining said third signal and said fourth signal to establish said fifth signal comprises a summing means.

40. Apparatus in accordance with claim 37 wherein said means for manipulating the temperature of said second feed stream in response to said fifth signal comprises:

a heat exchanger means operably located in said means for supplying said second feed stream;

means for supplying a heating fluid to said heat exchanger means;

bypass conduit means for bypassing at least a portion of said second feed stream around said heat exchanger means;

means for establishing a sixth signal representative of the temperature of said second feed stream;

means for comparing said fifth signal and said sixth signal and for establishing a seventh signal responsive to the difference between said fifth signal and said sixth signal; and means for manipulating the flow rate of said second feed stream through said bypass conduit means in responsive to said seventh signal to thereby manipulate the temperature of said second feed stream supplied to said second catalyst bed.

41. Apparatus in accordance with claim 37 additionally comprising means for establishing a sixth signal representative of the concentration of a second constituent in said first feed stream, said second constituent being a constituent which tends to poison the catalyst in said first catalyst bed and said second catalyst bed.

42. Apparatus in accordance with claim 41 wherein said means for establishing said fourth signal comprises:

means for establishing a seventh signal representative of the concentration of said first constituent in said first feed stream;

means, responsive to said seventh signal, for establishing an eighth signal representative of a prediction of the temperature change for said second feed stream required to compensate for changes in the concentration of said first constituent in said first feed stream;

means for establishing a ninth signal representative of the flow rate of said first feed stream;

means, responsive to said ninth signal, for establishing a tenth signal representative of a prediction of the temperature change for said second feed stream required to compensate for changes in the flow rate of said first feed stream;

means, responsive to said sixth signal, for establishing an eleventh signal representative of a prediction of the temperature change for said second feed stream required to compensate for a change in the concentration of said second constituent in said first feed stream; and means for combining said eighth signal, said tenth signal and said eleventh signal to establish said fourth signal.

43. Apparatus in accordance with claim 37 additionally comprising:

means for establishing at least one sixth signal representative of the reaction temperature in at least one zone of said second catalyst bed;

means for establishing a seventh signal representative of the highest allowable temperature for said at least one zone of said second catalyst bed;

means for comparing said sixth signal and said seventh signal and for establishing an eighth signal responsive to the difference between said sixth signal and said seventh signal; and means for overriding the control of the temperature of said second feed stream in response to said fifth signal to allow the temperature of said second feed stream to be manipulated in response to said eighth signal if the temperature represented by said sixth signal exceeds the temperature represented by said seventh signal.

44. Apparatus in accordance with claim 37 additionally comprising:

means for establishing a plurality of sixth signals representative of a temperature profile of an upper zone of said second catalyst bed;

means for selecting the one of said plurality of sixth signals which is representative of the highest temperature;

means for establishing a seventh signal representative of the highest allowable temperature in said upper zone of said second catalyst bed;

means for comparing the one of said plurality of sixth signals, which is representative of the highest temperature, to said seventh signal and for establishing an eighth signal responsive to the difference between said seventh signal and the one of said plurality of sixth signals which is representative of the highest temperature;

means for subtracting said seventh signal from the one of said plurality of sixth signals which is representative of the highest temperature and said seventh signal;

means for establishing a plurality of tenth signals representative of a temperature profile of a central zone of said second catalyst bed;

means for selecting the one of said plurality of tenth signals which is representative of the highest temperature;

means for establishing an eleventh signal representative of the highest allowable temperature in said central zone of said second catalyst bed;

means for comparing the one of said plurality of tenth signals, which is representative of the highest temperature, to said eleventh signal and for establishing a twelfth signal responsive to the difference between said said seventh signal and the one of said plurality of sixth signals which is representative of the highest temperature;

means for subtracting said eleventh signal from the one of said plurality of tenth signals which is representative of the highest temperature to establish a thirteenth signal;

means for establishing a plurality of fourteenth signals representative of a temperature profile of a lower zone of said second catalyst bed;

means for selecting the one of said plurality of fourteenth signals which is representative of the highest temperature;

means for establishing a fifteenth signal representative of the highest allowable temperature in said lower zone of said second catalyst bed;

means for comparing the one of said plurality of fourteenth signals, which is representative of the highest temperature, to said fifteenth signal and for establishing a sixteenth signal responsive to the difference between said fifteenth signal and the one of said plurality of fourteenth signals which is representative of the highest temperature;

means for subtracting said fifteenth signal from the one of said plurality of fourteenth signals which is representative of the highest temperature to establish a seventeenth signal;

means for overriding the control of the temperature of said second feed stream in response to said fifth signal to allow the temperature of said second feed stream to be manipulated in response to said eighth signal if said ninth signal is positive and if said ninth signal is representative of a larger positive value than said thirteenth signal or said seventeenth signal;

means for overriding the control of the temperature of said second feed stream in response to said fifth signal to allow the temperature of said second feed stream to be manipulated in response to said twelfth signal if said thirteenth signal is positive and if said thirteenth signal is representative of a larger positive value than said ninth signal or said seventeenth signal; and means for overriding the control of the temperature of said second feed stream in response to said fifth signal to allow the temperature of said second feed stream to be manipulated in response to said sixteenth signal if said seventeenth signal is positive and if said seventeenth signal is representative of a larger positive value than said ninth signal or said thirteenth signal.

45. A method for removing a first constituent in a feed stream comprising the steps of:

supplying a first feed stream containing said first constituent to a first reaction zone, a portion of said first constituent in said first feed stream being removed from said first feed stream in said first reaction zone;

withdrawing the reaction effluent from said first reaction zone as a first product stream and supplying said first product stream as a second feed stream to a second reaction zone, a portion of said first constituent in said second feed stream being removed from said second feed stream in said second reaction zone;

withdrawing the reaction effluent, containing a substantially reduced concentration of said first constituent, from said second reaction zone as a second product stream;

establishing a first signal representative of the concentration of said first consituent in said second product stream;

establishing a second signal representative of the desired concentration of said first constituent in said second product stream;

comparing said first signal and said second signal and establishing a third signal responsive to the difference between said first signal and said second signal;

establishing a fourth signal representative of a prediction of a temperature change for said second feed stream required to compensate for changes in the flow rate of said first feed stream and changes in the concentration of said first constituent in said first feed stream so as to maintain said first signal substantially equal to or less than said second signal;

combining said third signal and said fourth signal to establish a fifth signal representative of the temperature of said second feed stream required to maintain said first signal substantially equal to or less than said second signal; and manipulating the temperature of said second feed stream in response to said fifth signal.

46. A method in accordance with claim 45 wherein said step of establishing said fourth signal comprises:

establishing a sixth signal representative of the concentration of said first constituent in said first feed stream;

responsive to said sixth signal, establishing a seventh signal representative of a prediction of the temperature change for said second feed stream required to compensate for changes in the concentration of said first constituent in said first feed stream;

establishing an eighth signal representative of the flow rate of said first feed stream;

responsive to said eighth signal, establishing a ninth signal representative of a prediction of the temperature change for said second feed stream required to compensate for changes in the flow rate of said first feed stream; and combining said seventh signal and said ninth signal to establish said fourth signal.

47. A method in accordance with claim 46 wherein said step of combining said third signal and said fourth signal to establish said fifth signal comprises summing said third signal and said fourth signal.

48. A method in accordance with claim 45 wherein said step of manipulating the temperature of said first feed stream in response to said fifth signal comprises:

supplying said second feed stream through a heat exchanger means;

supplying a heating fluid to said heat exchanger means;

bypassing at least a portion of said second feed stream around said heat exchanger means;

establishing a sixth signal representative of the temperature of said second feed stream;

comparing said fifth signal and said sixth signal and establishing a seventh signal responsive to the difference between said fifth signal and said sixth signal; and manipulating the flow rate of said second feed stream through said bypass conduit means in response to said seventh signal to thereby manipulate the temperature of said first feed stream supplied to said first reaction zone.

49. A method in accordance with claim 45 additionally comprising the step of establishing a sixth signal representative of the concentration of a second constituent in said first feed stream, said second constituent being a constituent which tends to poison the catalyst in said first reaction zone and said second reaction zone.

50. A method in accordance with claim 49 wherein said step of establishing said fourth signal comprises:

establishing a seventh signal representative of the concentration of said first constituent in said first feed stream;

responsive to said seventh signal, establishing an eighth signal representative of a prediction of the temperature change for said second feed stream required to compensate for changes in the concentration of said first constituent in said first feed stream;

establishing a ninth signal representative of the flow rate of said first feed stream;

responsive to said ninth signal, establishing a tenth signal representative of a prediction of the temperature change for said second feed stream required to compensate for changes in the flow rate of said first feed stream;

responsive to said sixth signal, establishing an eleventh signal representative of a prediction of the temperature change for said second feed stream required to compensate for a change in the concentration of said second constituent in said first feed stream; and combining said eighth signal, said tenth signal and said eleventh signal to establish said fourth signal.

51. A method in accordance with claim 45 additionally comprising the steps of:

establishing at least one sixth signal representative of the reaction temperature in at least one zone of said second reaction zone;

establishing a seventh signal representative of the highest allowable temperature for said at least one zone of said second reaction zone;

comparing said sixth signal and said seventh signal and establishing an eighth signal responsive to the difference between said sixth signal and said seventh signal; and overriding the control of the temperature of said second feed stream in response to said fifth signal to allow the temperature of said second feed stream to be manipulated in response to said eighth signal if the temperature represented by said sixth signal exceeds the temperature represented by said seventh signal.

52. A method in accordance with claim 45 additionally comprising the steps of:

establishing a plurality of sixth signals representative of a temperature profile of an upper zone of said second reaction zone;

selecting the one of said plurality of sixth signals which is representative of the highest temperature;

establishing a seventh signal representative of the highest allowable temperature in said upper zone of said first catalyst bed;

comparing the one of said plurality of sixth signals, which is representative of the highest temperature, to said seventh signal and establishing an eighth signal responsive to the difference between said seventh signal and the one of said plurality of sixth signals which is representative of the highest temperature;

subtracting said seventh signal from the one of said plurality of sixth signals which is representative of the highest temperature to establish a ninth signal;

establishing a plurality of tenth signals representative of a temperature profile of a central zone of said second reaction zone;

selecting the one of said plurality of tenth signals which is representative of the highest temperature;

establishing an eleventh signal representative of the highest allowable temperature in said central zone of said second reaction zone;

comparing the one of said plurality of tenth signals, which is representative of the highest temperature, to said eleventh signal and establishing an twelfth signal responsive to the difference between said eleventh signal and the one of said plurality of tenth signals which is representative of the highest temperature;

subtracting said eleventh signal from the one of said plurality of tenth signals which is representative of the highest temperature to establish a thirteenth signal;

establishing a plurality of fourteenth signals representative of a temperature profile of a lower zone of said second reacton zone;

selecting the one of said plurality of fourteenth signals which is representative of the highest temperature;

establishing a fifteenth signal representative of the highest allowable temperature in said lower zone of said second reaction zone;

comparing the one of said plurality of fourteenth signals, which is representative of the highest temperature, to said fifteenth signal and establishing a sixteenth signal responsive to the difference between said fifteenth signal and the one of said plurality of fourteenth signals which is representative of the highest temperature;

subtracting said fifteenth signal from the one of said plurality of fourteenth signals which is representative of the highest temperature to establish a seventeenth signal;

overriding the control of the temperature of said second feed stream in response to said fifth signal to allow the temperature of said second feed stream to be manipulated in response to said eighth signal if said ninth signal is positive and if the said ninth signal is representative of a larger positive value than said thirteenth signal or said seventeenth signal;

overriding the control of the temperature of said second feed stream in response to said fifth signal to allow the temperature of said second feed stream to be manipulated in response to said twelfth signal if said thirteenth signal is positive and if said thirteenth signal is representative of a larger positive value than said ninth signal or said seventeenth signal; and overriding the control of the temperature of said second feed stream in response to said fifth signal to allow the temperature of said second feed stream to be manipulated in response to said sixteenth signal if said seventeenth signal is positive and if said seventeenth signal is representative of a larger positive value than said thirteenth signal or said ninth signal.

* * * * *